US009242672B2

(12) United States Patent
Brady et al.

(10) Patent No.: US 9,242,672 B2
(45) Date of Patent: Jan. 26, 2016

(54) UTILITY VEHICLE

(71) Applicant: Polaris Industries Inc., Medina, MN (US)

(72) Inventors: Louis J. Brady, Wyoming, MN (US); Gordon C. Slattery, Osceola, WI (US); Jeffrey T. Schertz, North Branch, MN (US); Timothy J. Giese, White Bear Township, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/201,049

(22) Filed: Mar. 7, 2014

(65) Prior Publication Data

US 2014/0251712 A1 Sep. 11, 2014

Related U.S. Application Data

(60) Provisional application No. 61/774,170, filed on Mar. 7, 2013.

(51) Int. Cl.
| B60G 17/015 | (2006.01) |
| B62D 21/11 | (2006.01) |
| B60K 5/00 | (2006.01) |
| B60G 7/00 | (2006.01) |
| B60G 3/18 | (2006.01) |
| B60G 3/20 | (2006.01) |
| B60G 9/02 | (2006.01) |

(52) U.S. Cl.
CPC ............... *B62D 21/11* (2013.01); *B60G 3/185* (2013.01); *B60G 3/20* (2013.01); *B60G 7/00* (2013.01); *B60G 9/02* (2013.01); *B60K 5/00* (2013.01); *B60G 2204/15* (2013.01); *B60G 2204/18* (2013.01); *B60G 2204/19* (2013.01); *B60G 2300/07* (2013.01); *B60G 2300/124* (2013.01); *B60G 2300/13* (2013.01)

(58) Field of Classification Search
USPC ............................ 280/5.513, 5.514, 124.11
See application file for complete search history.

(56) References Cited

U.S. PATENT DOCUMENTS

| 3,414,072 A | 12/1968 | Hodges, Jr. et al. |
| 3,729,210 A | 4/1973 | Cunningham |

(Continued)

FOREIGN PATENT DOCUMENTS

| GB | 2 344 796 A | 12/1998 |
| GB | 2 347 398 A | 9/2000 |
| JP | H07 266836 A | 10/1995 |

OTHER PUBLICATIONS

International Preliminary Report on Patentability issued by the European Patent Office, Jun. 11, 2015, for International Application No. PCT/US2014/021666; 18 pages, Jul. 27, 2015.

(Continued)

*Primary Examiner* — Jeffrey J Restifo
*Assistant Examiner* — Erez Gurari
(74) *Attorney, Agent, or Firm* — Faegre Baker Daniels LLP

(57) ABSTRACT

A vehicle is described herein having a rear drive mounted to a sub-frame where the sub-frame is movable relative to the frame, and where a suspension is movable relative to the sub-frame. Thus the vertical travel of the wheels is a combination of the vertical travel of the wheels relative to the sub-frame and the vertical travel of the sub-frame relative to the frame. The sub-frame could in the front or the rear, or both.

44 Claims, 32 Drawing Sheets

(56) References Cited

U.S. PATENT DOCUMENTS

| | | |
|---|---|---|
| 4,114,713 A | 9/1978 | Mery |
| 4,425,976 A | 1/1984 | Kimura |
| 4,573,702 A * | 3/1986 | Klem .................. 280/5.504 |
| 4,600,072 A | 7/1986 | Krude |
| 4,641,854 A | 2/1987 | Masuda et al. |
| 4,705,128 A | 11/1987 | Krude |
| 4,974,697 A | 12/1990 | Krude |
| 5,961,135 A | 10/1999 | Smock |
| 6,056,077 A | 5/2000 | Kobayashi |
| 6,196,349 B1 | 3/2001 | DeWald et al. |
| 6,581,716 B1 | 6/2003 | Matsuura |
| 6,588,536 B1 | 7/2003 | Chiu |
| 6,655,717 B1 | 12/2003 | Wang |
| 6,732,830 B2 | 5/2004 | Gagnon et al. |
| 6,799,781 B2 | 10/2004 | Rasidescu et al. |
| 7,380,805 B1 | 6/2008 | Turner |
| 7,694,769 B2 | 4/2010 | McGuire |
| 2004/0094928 A1 | 5/2004 | Amanuma |
| 2005/0173180 A1 | 8/2005 | Hypes et al. |
| 2005/0206111 A1 | 9/2005 | Gibson et al. |
| 2007/0023566 A1 | 2/2007 | Howard |
| 2011/0272900 A1 * | 11/2011 | Lares .................. 280/5.513 |

OTHER PUBLICATIONS

International Search Report and Written Opinion issued by the European Patent Office, May 21, 2014, for International Application No. PCT/US2014/021666; 9 pages.

Written Opinion of the International Preliminary Examining Authority, issued by the European Patent Office, Feb. 23, 2015, for International Application No. PCT/US2014/021666; 7 pages.

* cited by examiner

UTILITY VEHICLE

The present application claims priority to provisional Ser. No. 61/774,170 filed Mar. 7, 2013, the subject matter of which is incorporated herein by reference.

FIELD OF THE INVENTION

The present invention relates generally to a vehicle and in particular to a utility vehicle having side-by-side seating.

BACKGROUND AND SUMMARY OF THE INVENTION

Side-by-side vehicles are known. The present disclosure relates to vehicles, including utility vehicles. The present disclosure relates to suspension systems for such vehicles, and more particularly to suspensions having increased vertical travel, for use in either or both of front and rear suspensions.

In one embodiment, a vehicle is described having a frame; ground engaging members supporting the frame; a propulsion unit supported by the frame; a sub-frame pivotably coupled to the frame; and a final drive is drivingly coupled to the propulsion unit, and supported by the sub-frame. Right and left suspension assemblies couple the ground engaging assemblies to the frame independent of each other; and drive members couple the rear drive to the ground engaging members.

In another embodiment, a vehicle is shown and described having a frame; ground engaging members supporting the frame; a propulsion unit supported by the frame; a sub-frame pivotably coupled to the frame; and a final drive is drivingly coupled to the propulsion unit, and supported by the sub-frame. At least some of the ground engaging members are driven ground engaging members and the driven ground engaging members are movable relative to the frame and sub-frame. Drive members couple the rear drive to the driven ground engaging members.

In another embodiment, a vehicle comprises a frame; ground engaging members supporting the frame; a propulsion unit supported by the frame; a sub-frame pivotably coupled to the frame; a final drive drivingly coupled to the propulsion unit, and supported by the sub-frame; a lower suspension member pivotally mounted to the sub-frame and coupling the ground engaging assemblies to the frame; and drive members coupling the rear drive to the ground engaging members.

The above mentioned and other features of the invention, and the manner of attaining them, will become more apparent and the invention itself will be better understood by reference to the following description of embodiments of the invention taken in conjunction with the accompanying drawings. These above mentioned and other features of the invention may be used in any combination or permutation.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a side-by-side vehicle, it should be understood that the features disclosed herein may have application to other types of vehicles such as all-terrain vehicles, motorcycles, watercraft, snowmobiles, and golf carts.

Figure 1:
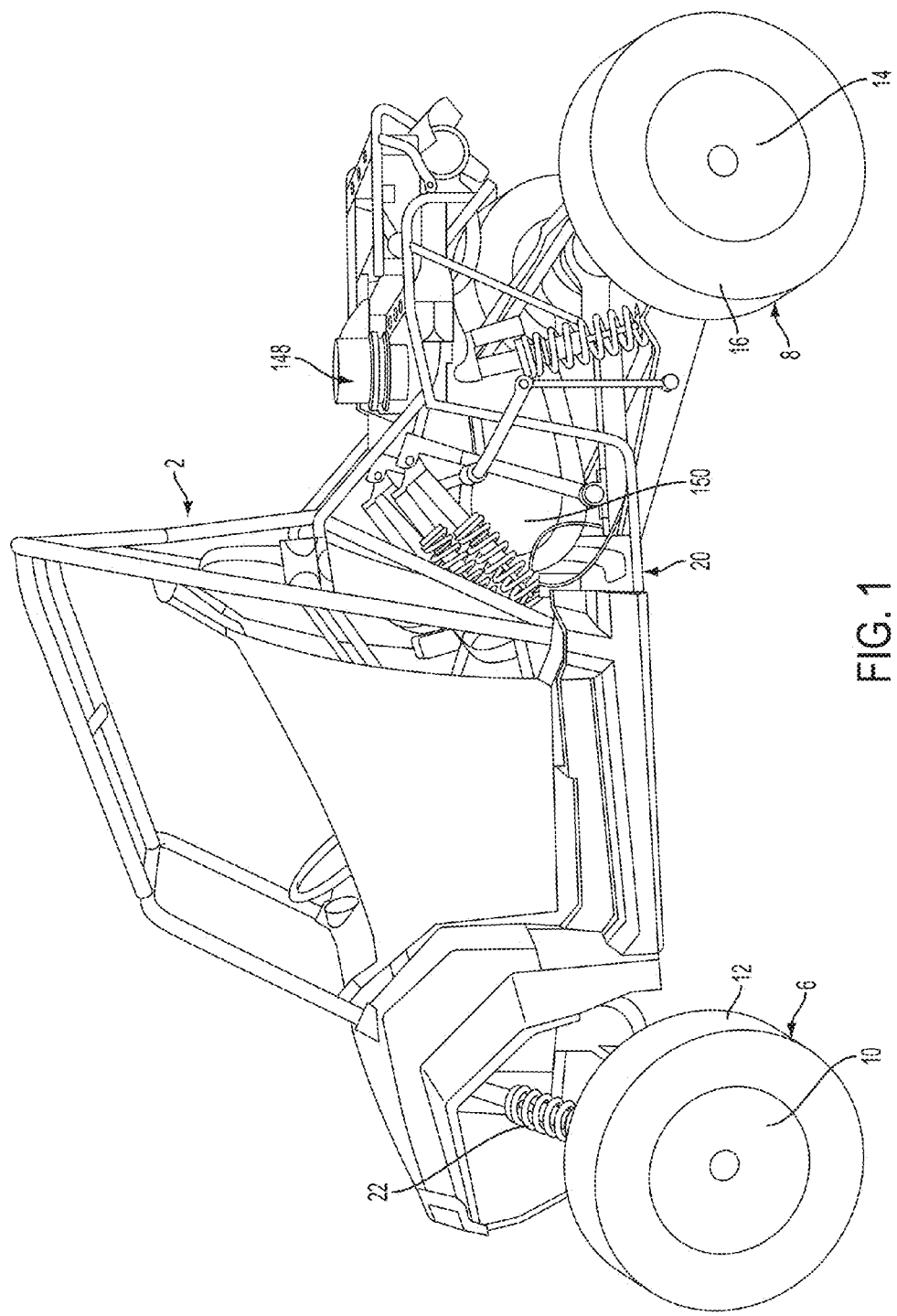
FIG. 1 is a side, perspective view of an exemplary side-by-side vehicle.

Referring to FIG. 1, an illustrative embodiment of a vehicle 2 is shown. Vehicle 2 as illustrated includes a plurality of ground engaging members, namely front ground engaging members 6, and rear ground engaging members 8. Illustratively, ground engaging members 6 are wheels 10 and associated tires 12. Ground engaging members 8 are wheels 14 and associated tires 16. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

Referring to FIG. 1, the front wheels 10 are coupled to a frame 20 of vehicle 2 through a front independent suspension 22. Front independent suspension 22 in the illustrated embodiment is a double A-arm suspension. The double A-arm suspension may be similar to that shown in U.S. Pat. No. 7,819,220 or US Patent Application Publication Number 20120031694A1. Other types of suspension systems may be used for front independent suspension 22, such as the strut suspension found in U.S. patent application Ser. No. 13/362,889 entitled "ALL TERRAIN VEHICLE", the subject matter of which is incorporated herein by reference. With reference to FIGS. 2 through 5, a rear suspension assembly 30 will be described in greater detail.

Figure 2:
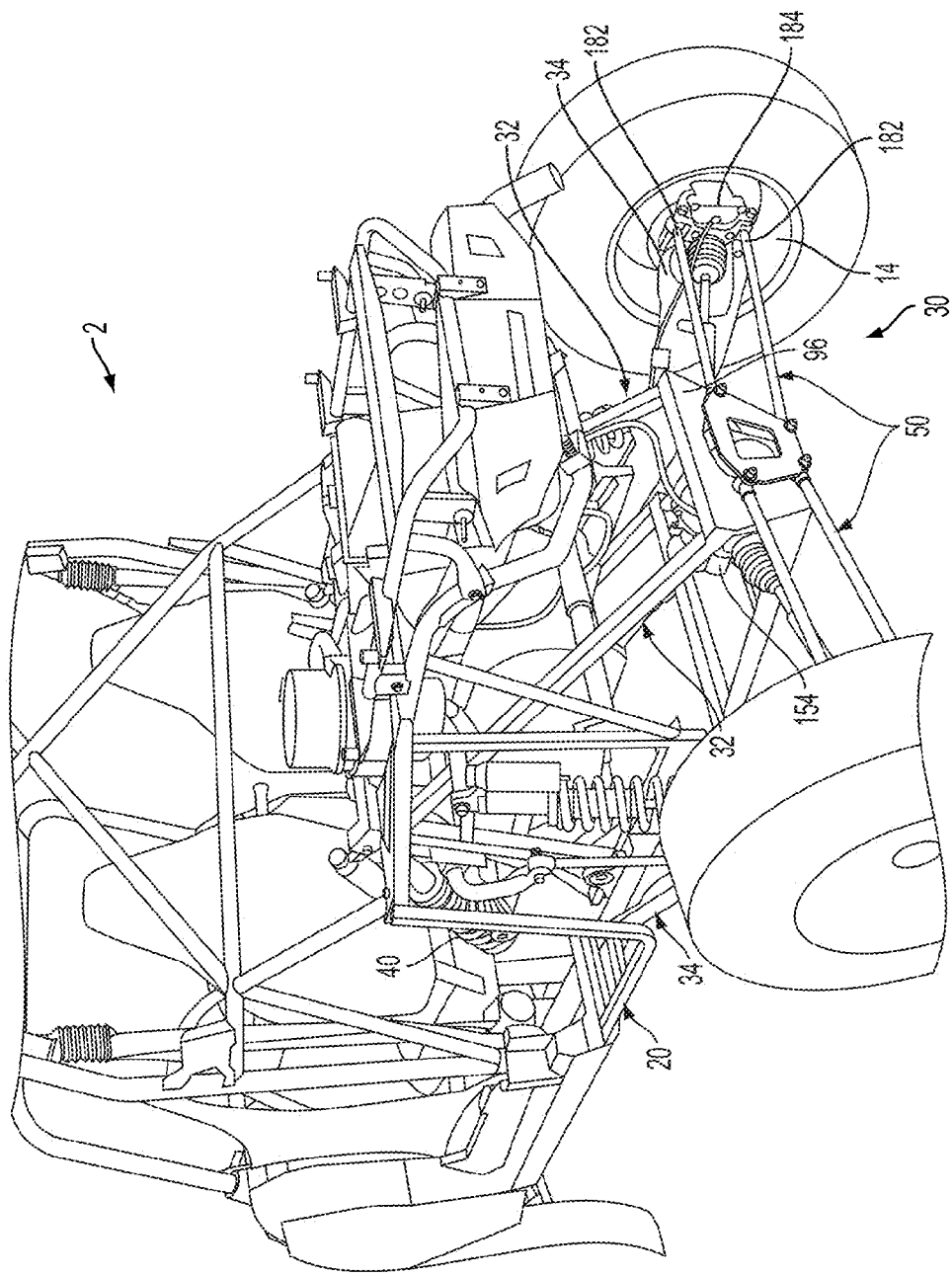
FIG. 2 is a left rear, perspective view of the side-by-side vehicle of FIG. 1.
Figure 3:
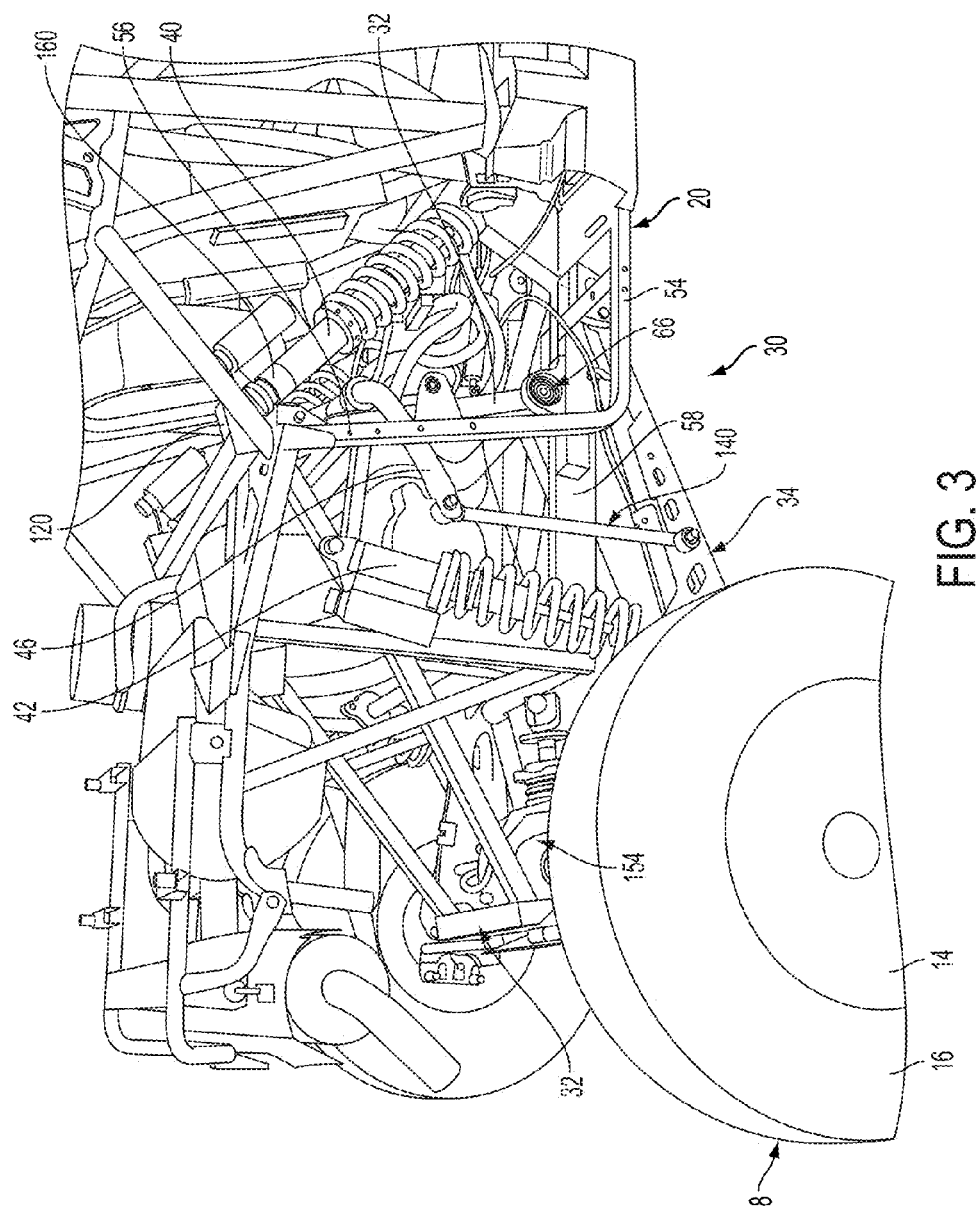
FIG. 3 illustrates a right perspective view of the rear suspension of the exemplary side-by-side vehicle of FIG. 1.

As shown in FIGS. 2 and 3, rear suspension 30 is comprised of a sub-frame 32 which is pivotally mounted to frame 20; trailing arms 34 which are pivotally mounted to frame 20 and are coupled to wheel 14; front shock absorbers 40 are positioned between sub-frame 32 and frame 20; rear shock absorbers 42 are coupled between sub-frame 32 and trailing arms 34; sway bar 46 is coupled between sub frame 32 and trailing arms 34; and radius arms 50 (FIG. 5) are coupled between wheel 14 and sub-frame 32.

Figure 3A:
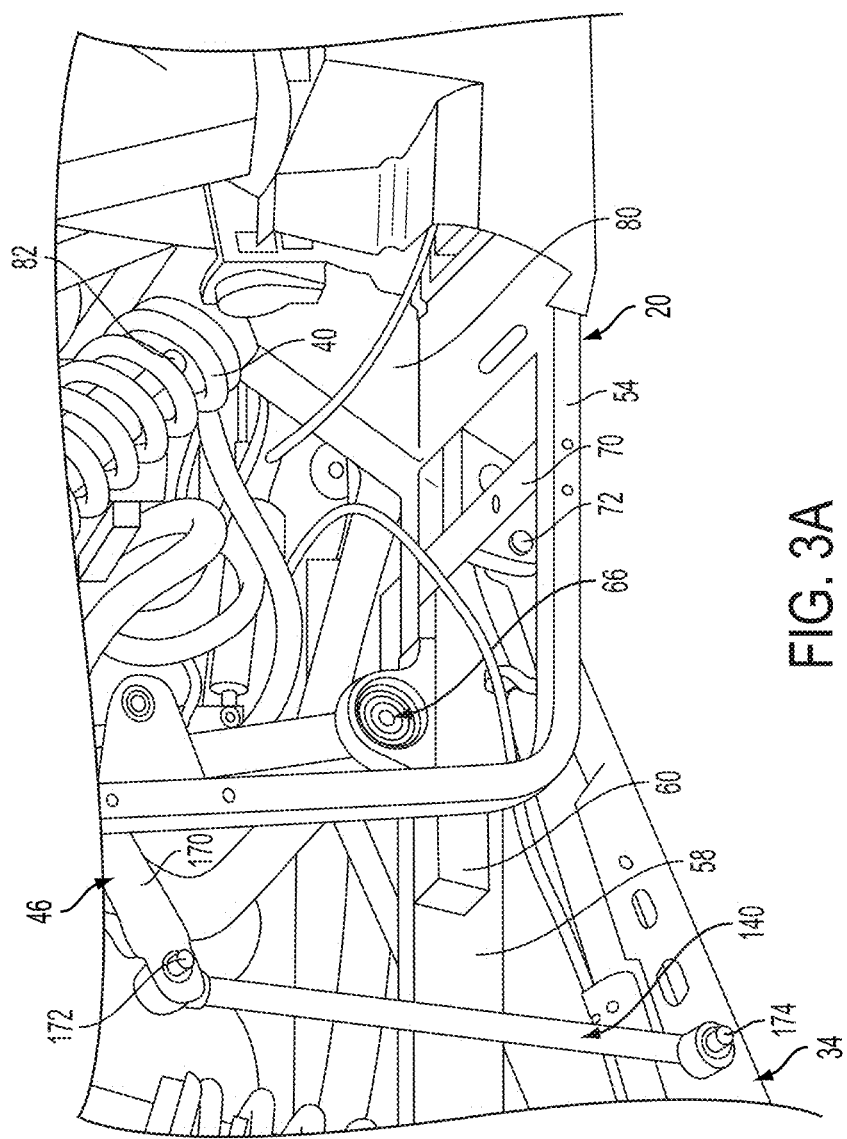
FIG. 3A illustrates an enlarged view of a portion of FIG. 3.

With respect to FIGS. 2, 3 and 3A, the relevant portions of frame 20 will be described herein. The frame 20 may be similar in construction to that shown in U.S. Pat. No. 7,819,220 or US Patent Application Publication Number 20120031694A1, the subject matter of which is incorporated herein by reference. As shown in FIG. 3, frame 20 includes a rearwardly extending frame member 54 which transitions upwardly into an upright portion 56. A main frame rail 58 of frame 20 extends rearwardly and generally horizontally and terminates adjacent to rear shock 42. As shown in FIG. 3A, frame 20 defines three pivot points. First, bracket 60 is positioned on main frame rail 58 and retains bearing 66 thereto. Bearing 66 provides a pivot point for sub-frame 32 as described herein. Secondly, frame 20 defines a bracket 70 positioned between frame members 54 and 58 defining a front pivot point 72 for trailing arm 34. Finally, frame 20 includes a pedestal at 80 defining a pivot point 82 for front shock absorber 40.

Figure 4:
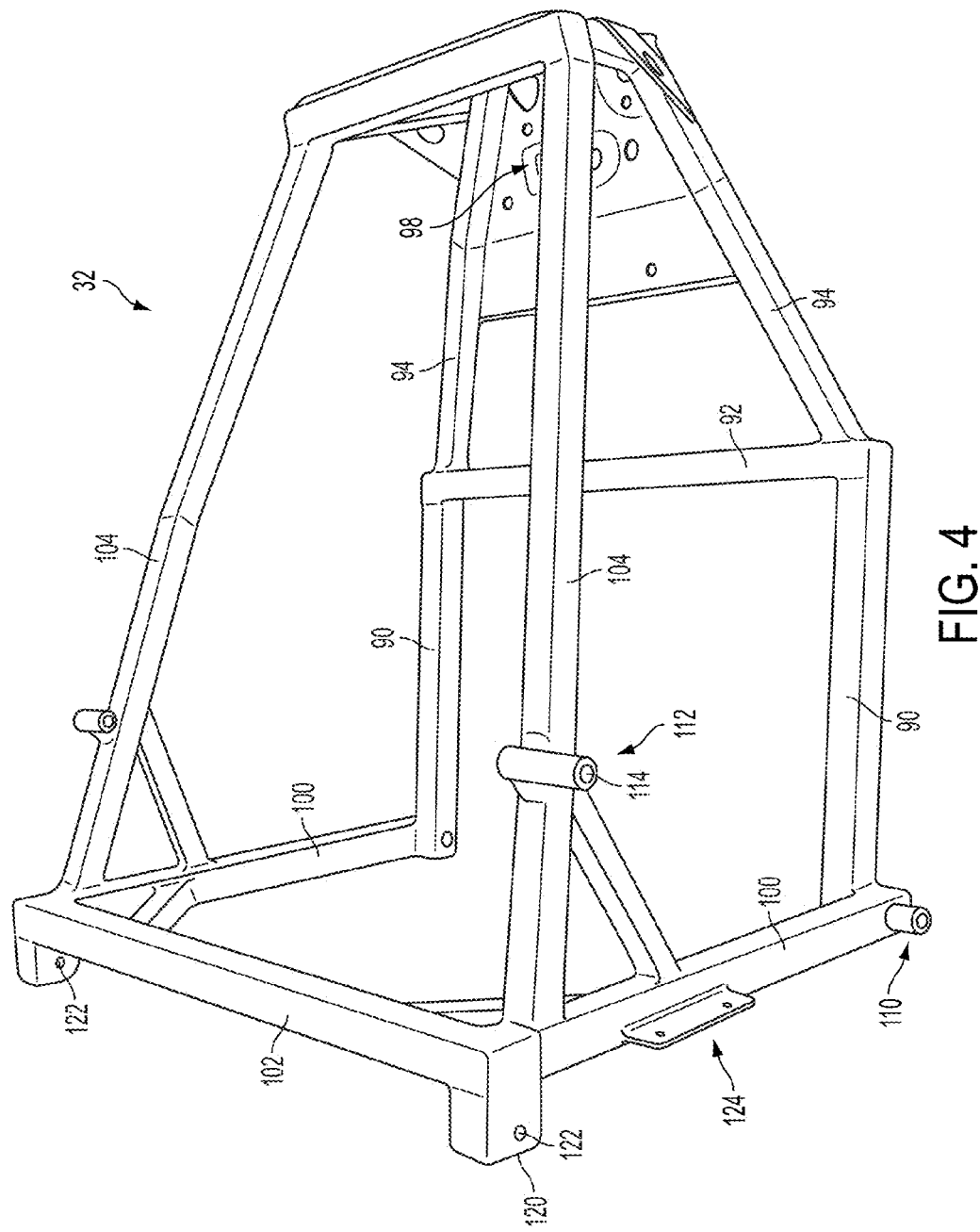
FIG. 4 illustrates a left perspective of the sub-frame for the side-by-side vehicle of FIG. 1.

With reference now to FIG. 4, the sub-frame 32 will be described in greater detail. Sub-frame 32 is comprised of lower frame rails 90 having a cross bar 92 with inwardly tapered frame rails 94 extending to an end wall 96 (see FIG. 5). A lower tray 98 is positioned across frame rails 94 to define a final drive mount. Vertical uprights 100 extend upwardly from frame rails 90 and intersect with cross bar 102. Upper frame rails 104 extend from uprights 100 to end wall 96.

Sub frame 32 defines multiple pivot points. First, sub frame 32 defines a pivot point at 110 which cooperates with bearing 66 (FIGS. 3, 3A.) Sub frame 32 also defines a mount 112 having an inner opening at 114 for mounting a top end of shock 42. Sub-frame 32 also includes a mount at 120 providing a pivot mount 122 for a top end of shock 40. Finally, sub-frame 32 includes a bracket 124 providing a mounting position for a sway bar as described herein in further detail.

As described above, trailing arms 34 are pinned at 72 (FIG. 3A) to bracket 70 and can therefore swing upwardly relative to frame 20. Sway bar 46 (FIG. 3) is coupled at each end to brackets 124 (FIG. 4) and thus pivots relative to sub-frame 32. Sway bar 46 is also coupled to trailing arms 34 by way of links 140 as shown best in FIGS. 3 and 3A. Radius arms 50 are coupled to the rear plate 96 at an inner end thereof (see FIG. 5) and to the wheel at an outer end thereof (see FIG. 2).

Figure 5:
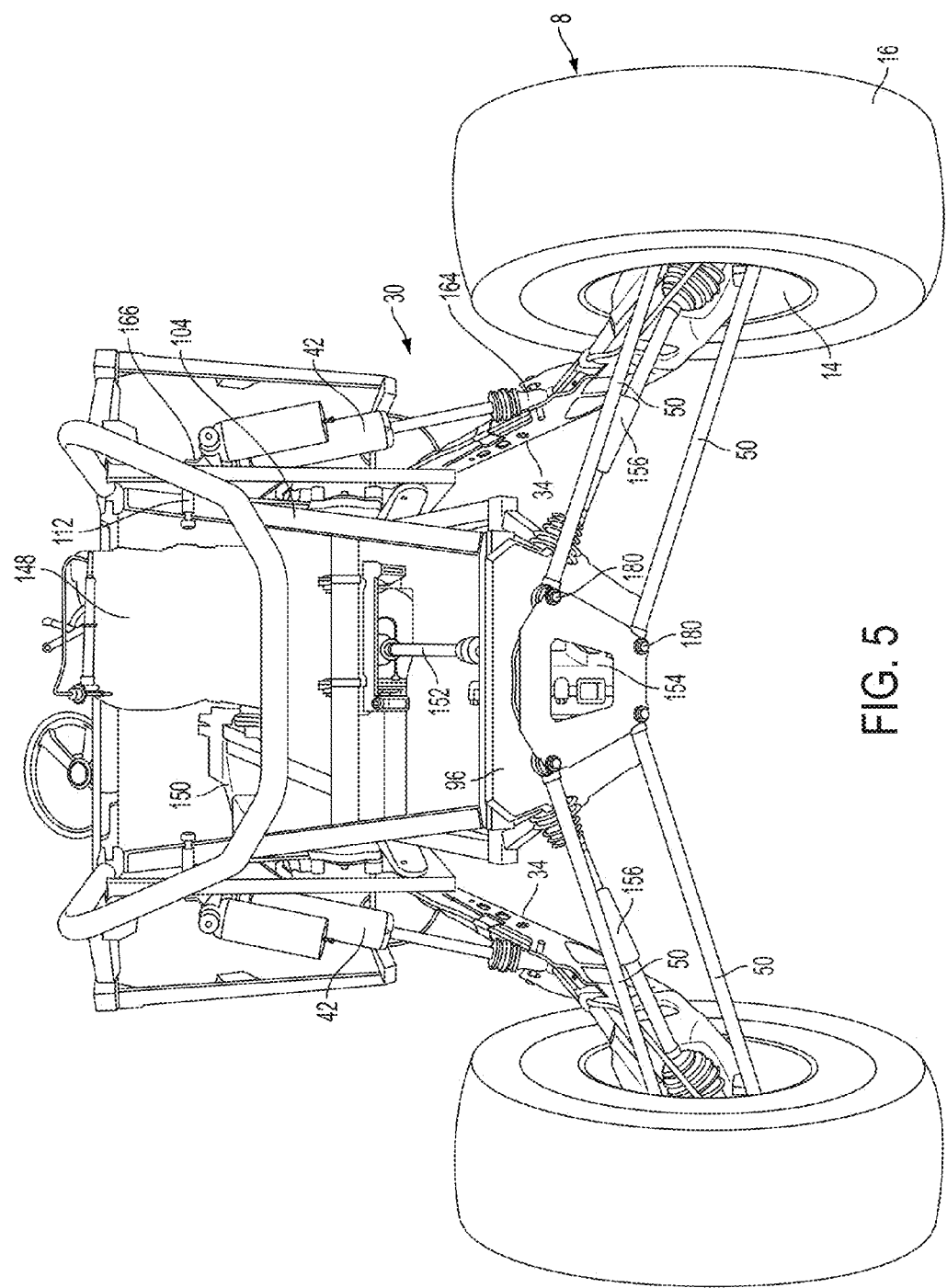
FIG. 5 illustrates a rear view of the exemplary side-by-side vehicle of FIG. 1.

With reference to FIGS. 1 and 5, a drive train for utility vehicle 2 includes an engine 148, a transmission 150 which may include a CVT transmission and or a gearbox, a drive shaft 152 (see FIG. 5), a rear drive such as a differential 154 (see FIG. 5), and half shafts 156 (FIG. 5). It should be understood that drive shaft 152 couples the transmission 150 to final drive 154, through such couplings as U-joints or the like. It should be understood that half shafts 156 couple the final drive 154 to rear wheels 8, through such couplings as U-joints, constant velocity joints, or the like.

As shown best in FIGS. 2 and 3, engine 148 and transmission 150 are coupled to the frame 20, and thus are fixed relative to frame 20. Rear drive 154 is coupled to sub frame 32 at rear tray 98, and is fixed relative to the sub frame 32, but movable relative to the frame. Rear drive 154 moves with sub frame 32, and drive shaft 152 allows the coupling movement to the power train. As such, the vertical travel of wheels 8 is greatly improved and increased.

With more particularity, and with reference to FIGS. 3 and 3A, shock 40 is shown pinned at a lower end 82 to pedestal 80, and at an upper end 160 to coupling 120 of subframe 32. Thus, clockwise rotation of sub-frame 32 (from the perspective of FIG. 3) about bearing 66 compresses or strokes shock 40. Trailing arms 34 also pivot about point 72 (FIG. 3A), and trailing arms are coupled to subframe 32 through shock 42 and sway bar 46. With reference to FIG. 5, shock 42 is coupled between trailing arms 34 and subframe 32. A lower end 164 of shock 42 is coupled to trailing arm 34 and an upper end 166 of shock 42 is coupled to mount 112. Thus, movement of trailing arms 34 about pivot 72 (FIG. 3A) causes compression of shock 42, but also places an upward component of force on subframe 32 at 112.

The trailing arms 34 are also coupled to each other. As shown best in FIGS. 3 and 3A, sway bar 46 is attached to brackets 124 (see FIG. 4). As shown best in FIG. 3A, sway bar 46 has a trailing leg 170 which is pinned to link 140 at 172, and pinned to trailing arm 34 at 174. Thus upward movement of one trailing arm 34 on one side, transfers the same directional force (upward or downward) on the opposite trailing arm 34. Finally, radius arms 50 (FIG. 5) have inner ends 180 coupled to rear plate 96, and outer ends 182 coupled to a wheel hub 184 (FIG. 2).

Typically, the limiting factor for the vertical movement of wheels relative to the frame is the angular rotation of the rear half shafts 156 relative to the final drive 154. Typically, the angle of rotation relative to a horizontal plane is about 14° up and 14° down, or about 28° for a full sweep angle. However, in this case the sub frame 32 moves upwardly and downwardly relative to the frame 20 and the rear drive 154 moves with the sub frame 32. Thus, the rear wheel movement has two components: the movement of the wheels 8 relative to the sub frame 32 and the movement of the sub frame 32 relative to the frame 20.

Figure 6:
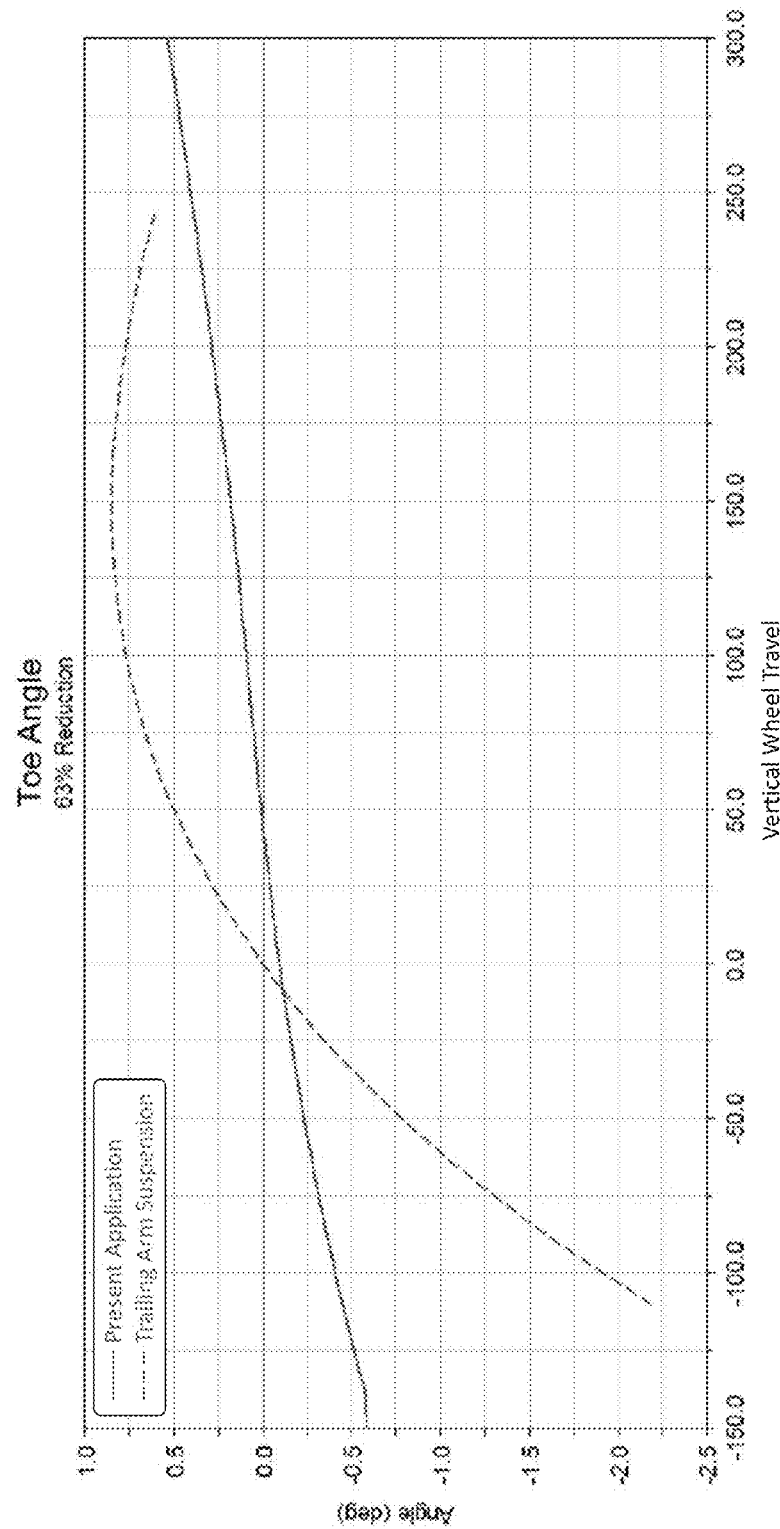
FIG. 6 illustrates a curve representing the toe angle changes for the exemplary side-by-side vehicle of FIG. 1, in comparison to a prior vehicle having a trailing arm suspension.

With reference to FIG. 6, a chart is shown which compares the Toe Angle for the present embodiment with regard to a prior art vehicle having a trailing arm suspension. In other trailing arm suspension systems, during the suspension travel, as the camber changes, significant toe change also occurs. This toe change in the rear suspension causes rear end steering which can make the overall steering difficult. So the goal is to minimize toe change in the rear. As shown, at full rebound, the prior art vehicle is almost 2.5° and as the vehicle get towards full compression it gets close to 1°, so it has over 3° of total toe change over the range of travel.

With the present embodiment, due to the reduction of the trailing arm movement, the total toe change is about 1° through the full range of travel. Thus, the toe change is about ⅓ of the prior vehicle, with more vertical suspension travel. The vertical travel of the trailing arms has been reduced by about 50%, so for an 18" vertical travel of the suspension overall, approximately 9" is from the trailing arms and approximately 9" is from the sub-frame travel.

Figure 7:
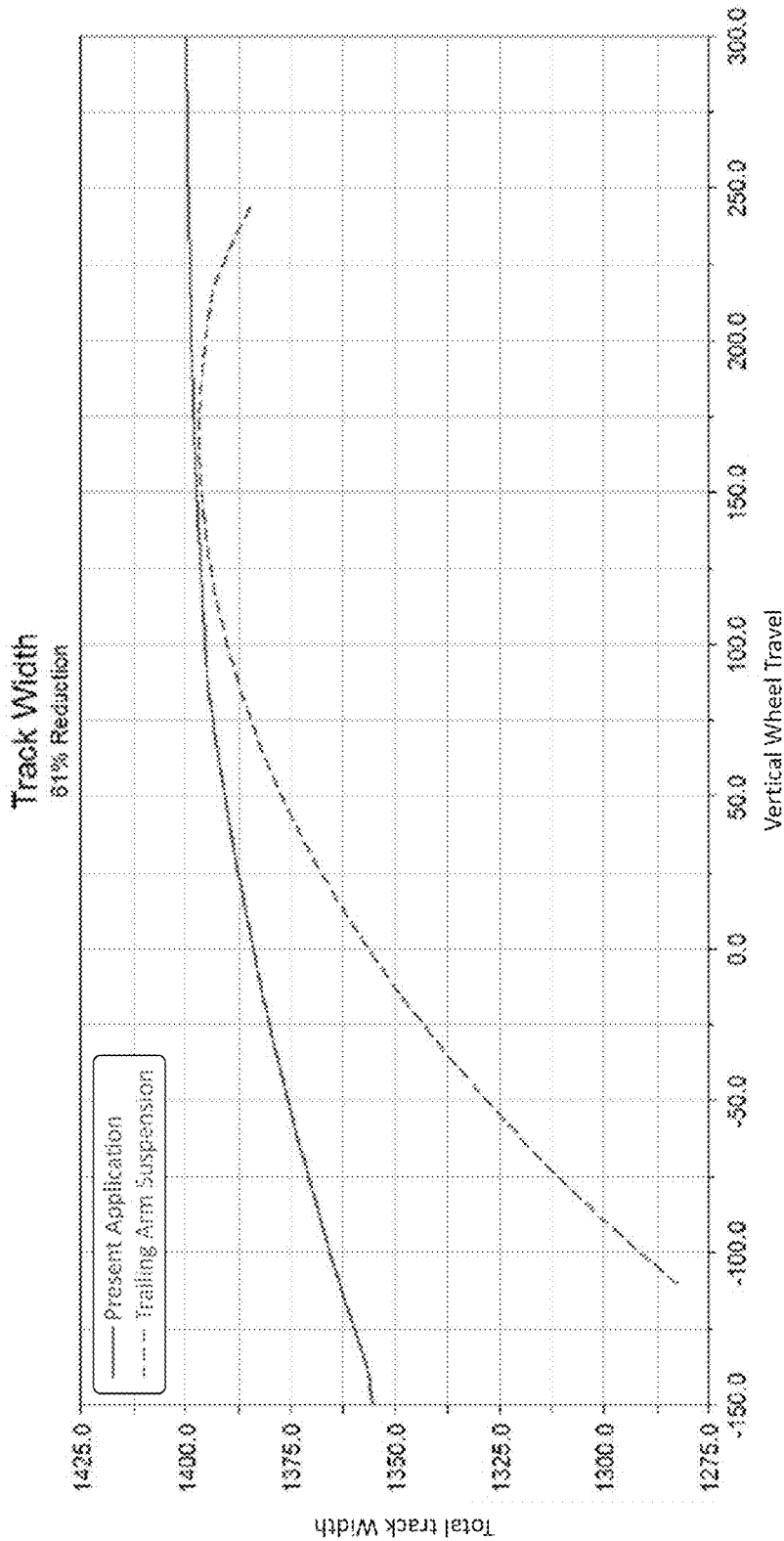
FIG. 7 illustrates a curve representing the track change comparison for the exemplary side-by-side vehicle of FIG. 1, in comparison to a prior vehicle having a trailing arm suspension.

In a like manner, and with reference to FIG. 7, the track change is significantly reduced as well, where the track is the centerline distance between the two rear tires. Due to the minimized movement of the trailing arms, the sweep angle of the radius arms is also reduced, which effectively reduces the track change. Thus, as shown in FIG. 7, a 60% reduction in track change has been accomplished with the above described embodiment. Reduction in track width change will produce a better ride, as the suspension will feel less stiff.

Figure 8:
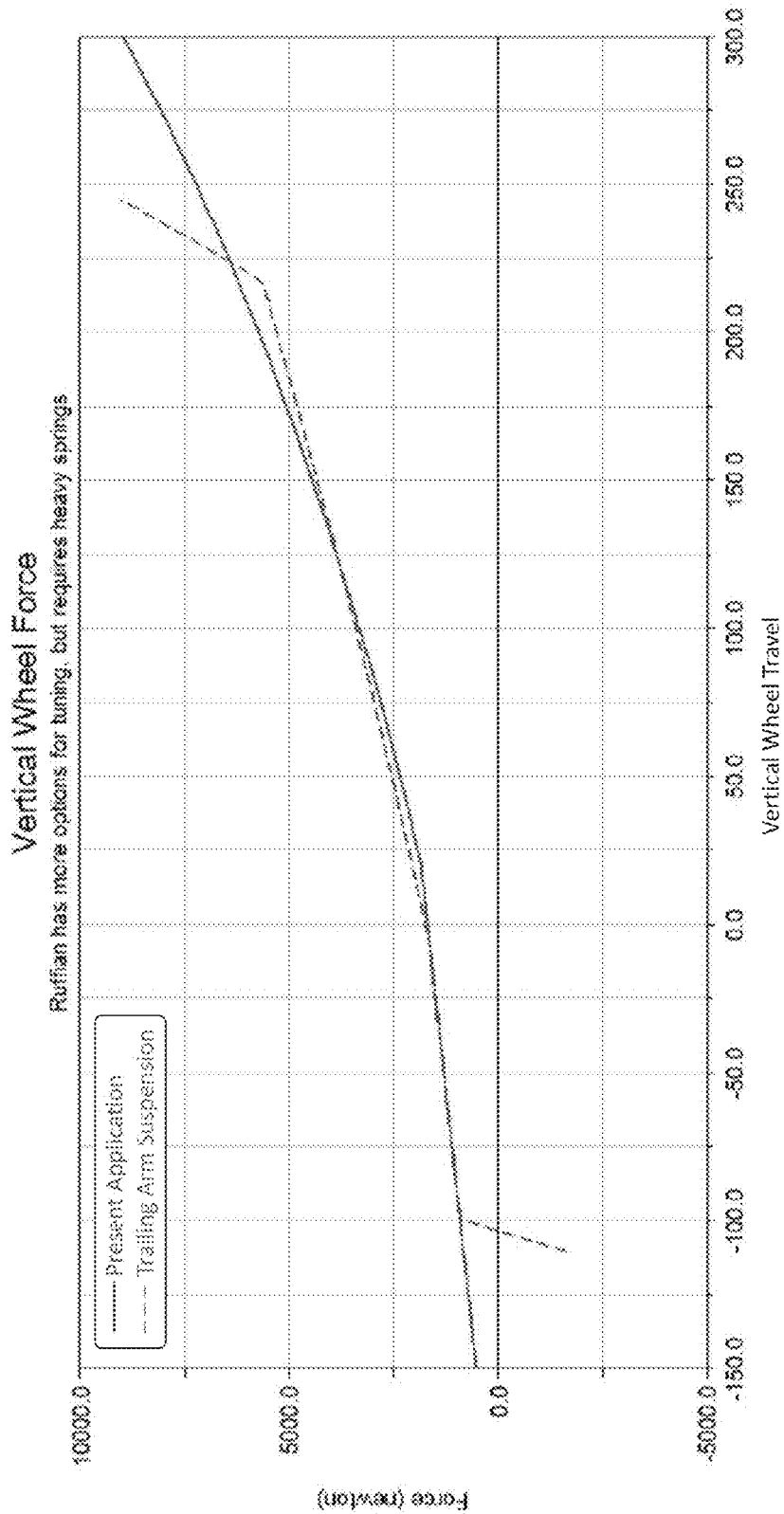
FIG. 8 illustrates a curve representing the vertical force comparison of various vehicles, in comparison to a prior vehicle having a trailing arm suspension.

As shown in FIG. 8, the ride characteristics can be replicated from the prior vehicles with the toe and track width change, so the ride can feel the same. Also advantageously, the suspension becomes more progressive with continued travel as shown above 150 mm travel. Also due to the multiple springs of the above described embodiment, the options for shock tuning are increased.

Figure 9:
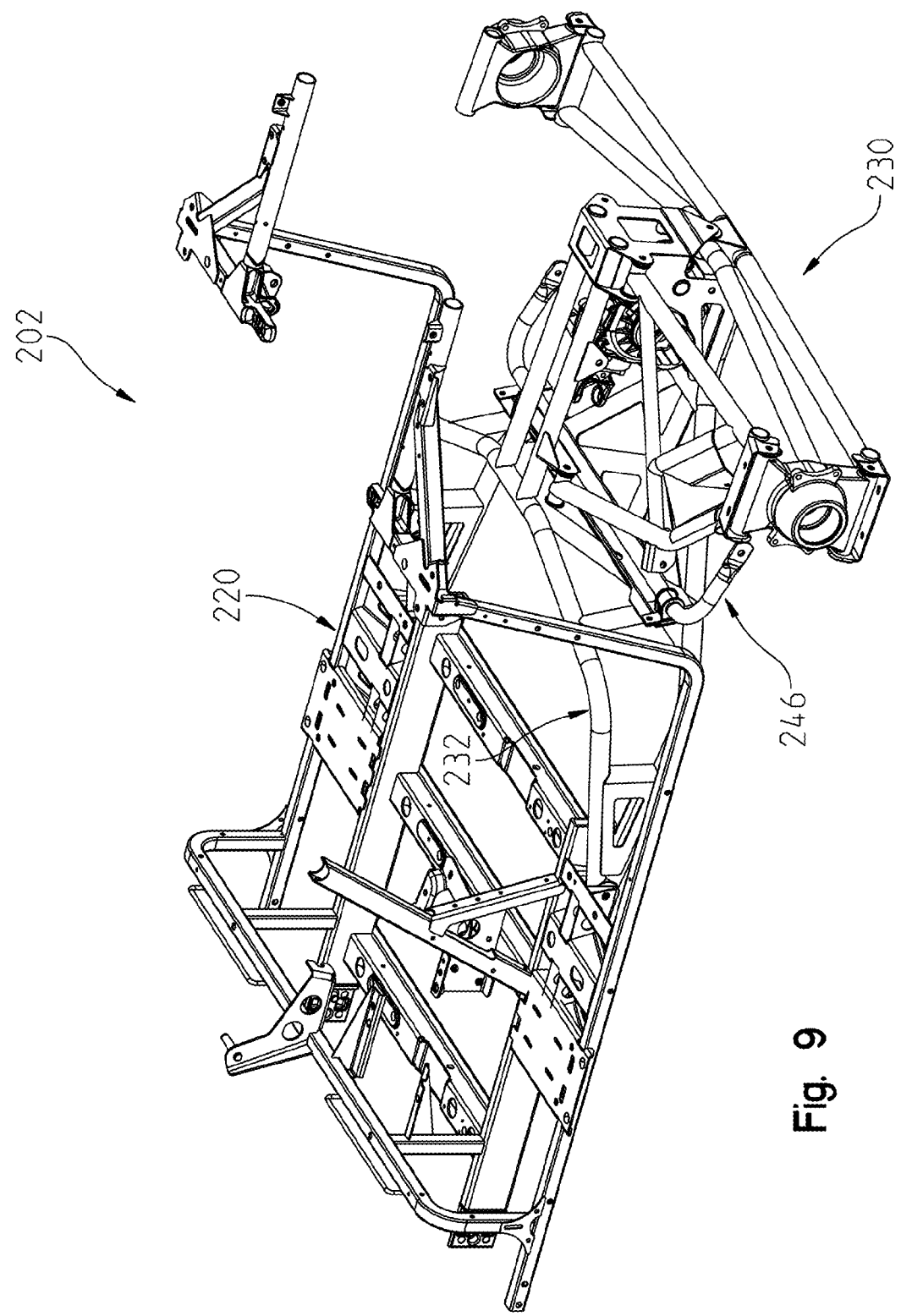
FIG. 9 shows a left rear perspective view of an alternate version of a two shock vehicle suspension.
Figure 10:
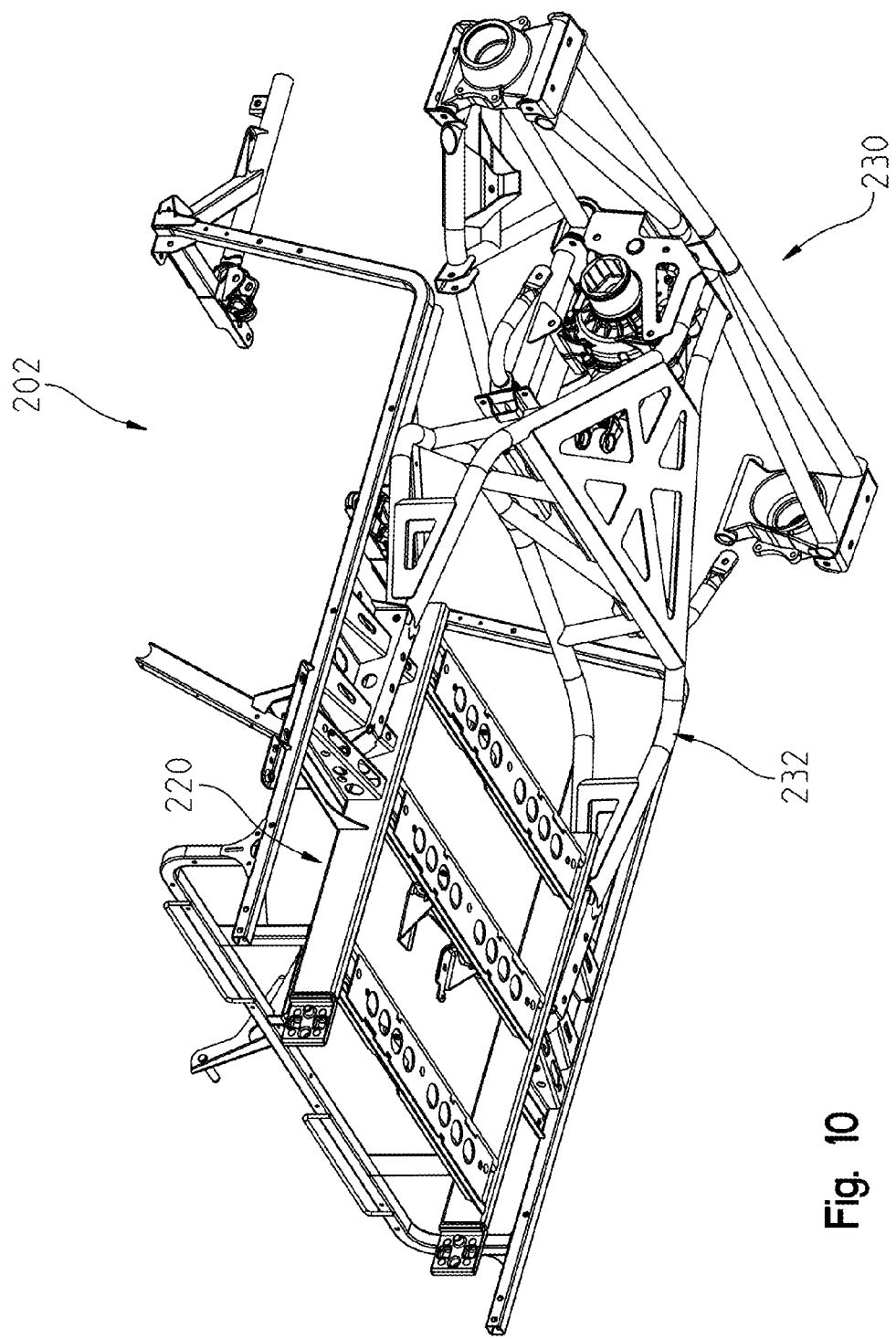
FIG. 10 shows a left front underside perspective view of the alternate vehicle suspension of FIG. 9.
Figure 11:
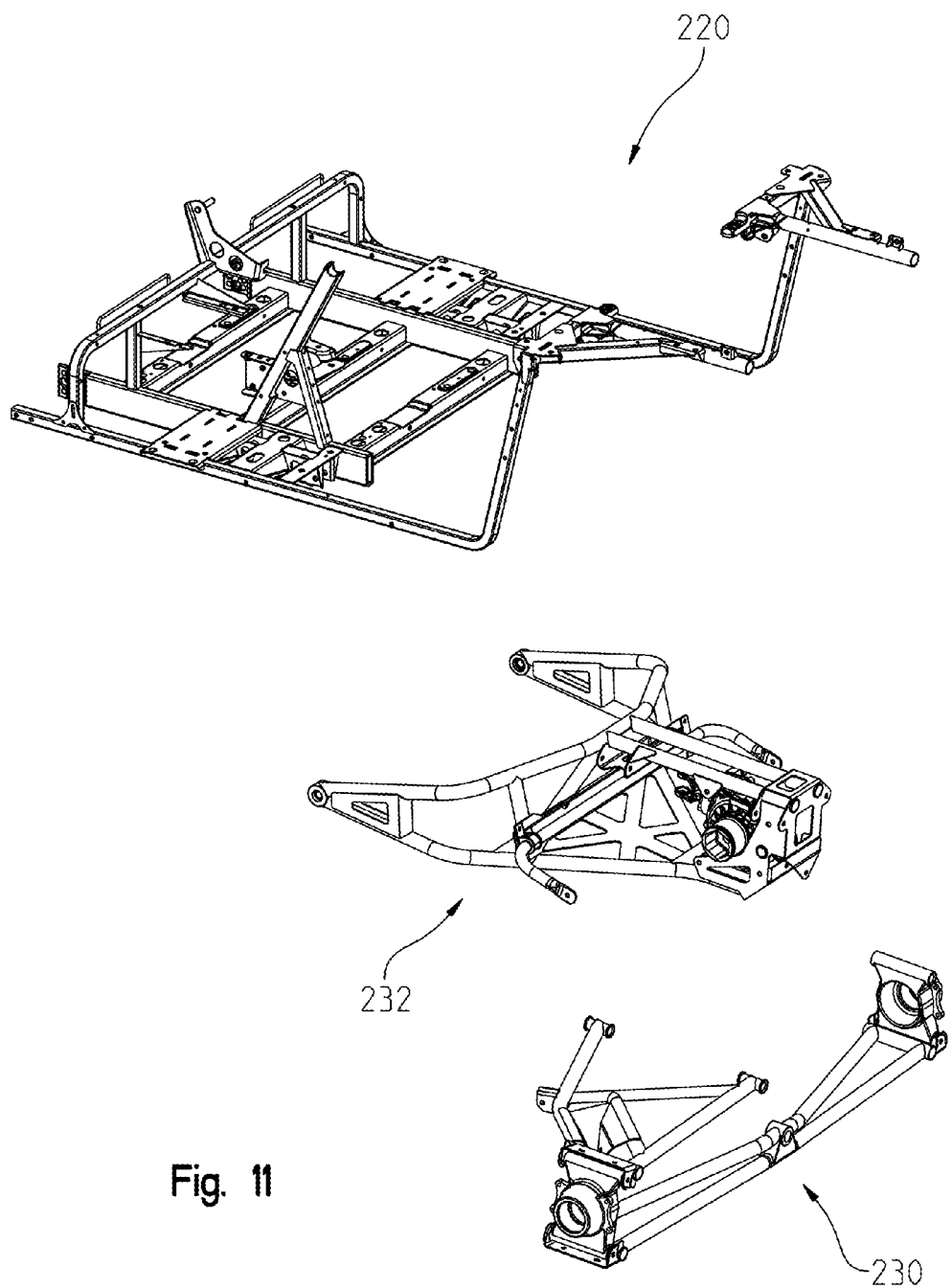
FIG. 11 shows a left rear perspective exploded view similar to that of FIG. 9.

With reference now to FIGS. 9-13, a second embodiment of the disclosure shows a rear suspension having a two shock design. With reference first to FIGS. 9-11, a vehicle 202 is shown having a frame 220 having rear suspension 230. Rear suspension 230 is pivotally mounted to the sub-frame 232 and sub-frame 232 is pivotally attached to frame 220. Torsion bar 246 couples rear suspension 230 and sub-frame 232 together.

Figure 12:
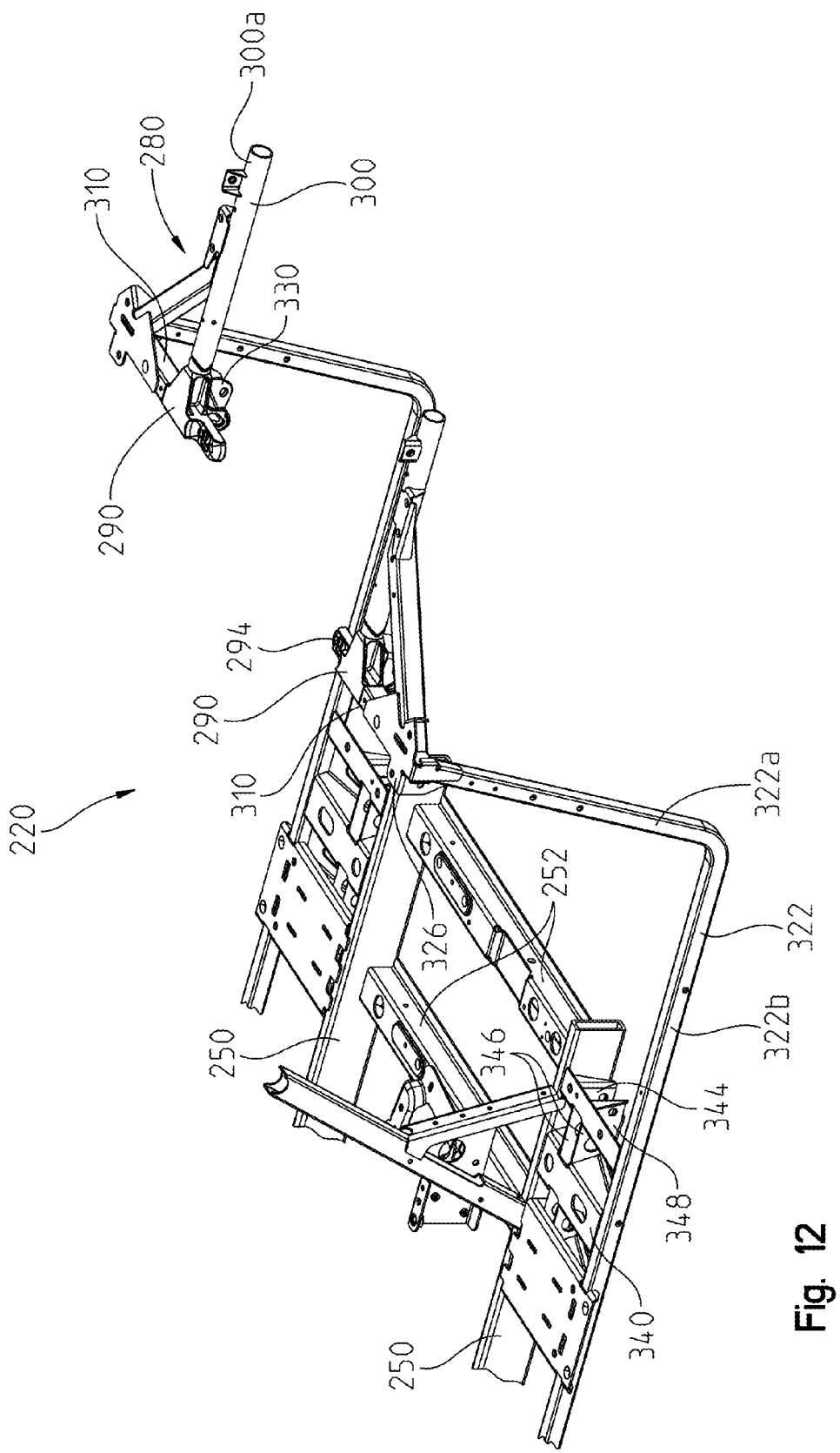
FIG. 12 shows a left rear perspective view of the rear frame.

With reference now to FIG. 12, frame 220 is shown in greater detail. As shown, frame 220 includes main frame tubes 250 coupled together by way of cross-tubes (channels) 252. Frame 220 further includes an upper platform structure 280 supported by frame tube 322, and more particularly by upwardly extending frame tube portion 322a. Couplings 290 are attached at a top end of platform structure 280 and have multiple coupling attachments. Coupling 290 includes laterally extending portions 294 which couples a cross frame tube (not shown) between the two opposed couplings 290 to rigidify the frame. Rearwardly extending frame tubes 300 are also coupled to couplings 290 and include a generally horizontal portion 300a attached to coupling 290, for supporting a utility box (not shown). Couplings 290 are also coupled to laterally extending frame tube portions 310. Finally, coupling 290 includes a shock mounting bracket at 330.

With reference still to FIG. 12, frame tube portion 322 includes a generally vertically extending portion 322a coupled to bracket 326 and a generally horizontally extending portion 322b, which runs parallel to and outside of mainframe tubes 250. Cross brackets 340 couple frame tubes 250 and 322 together and include mounting pivot 344 for subframe 232 as described herein. Pivot 344 is defined by offset plates having mounting apertures therethrough.

Figure 13:
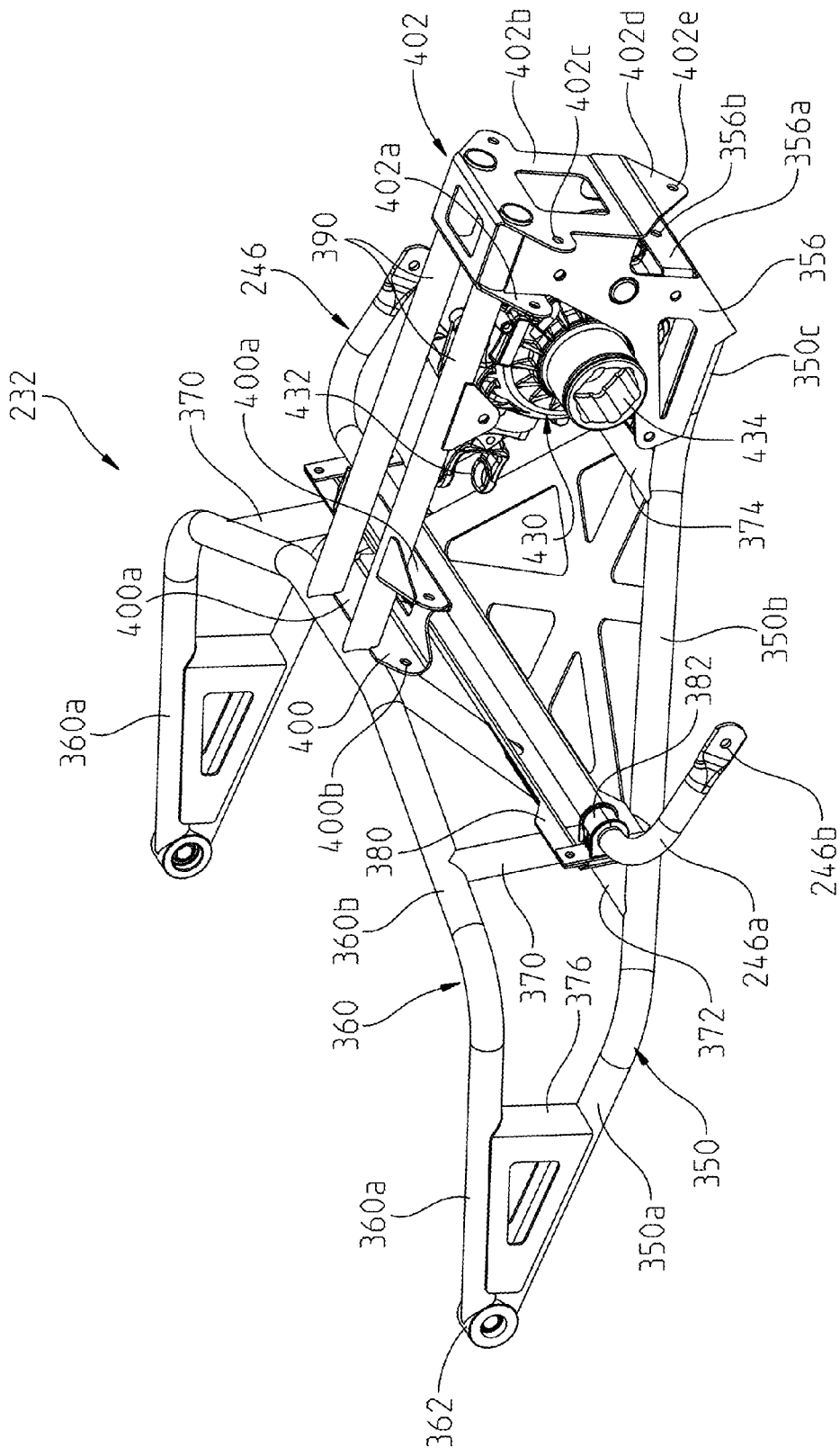
FIG. 13 shows a left rear perspective view of the rear sub-frame.

With reference now to FIG. 13, subframe 232 is shown in greater detail. Subframe 232 includes frame tubes 350 having a generally forward portion 350a, a transitional portion 350b extending rearwardly and inwardly, which transitions to portion 350c coupled to rear bracket 356. A second tube 360 is provided having portions 360a coupled to tube portions 350a at a pivot coupling 362. Frame tube 360 further includes cross tube portion 360b extending laterally and transitioning into a second tube portion 360a. Tubes 350 and 360 are generally coupled together by way of frame tubes 370, 372, 374, and brackets 356 and 376. Tubes 370 include a bracket 380 for mounting sway bar 246 thereto by way of couplers 382.

Bracket 356 and frame tube 360 are coupled together by way of longitudinally extending tubes 390, which also retain front and rear brackets 400, 402. Front bracket 400 is generally defined by a channel-shaped member having offset plate portions 400a including mounting apertures 400b for mounting alignment arms as described herein. Third bracket 402 includes offset plates 402a and 402b, which include mounting apertures 402c for mounting alignment arms as described herein. Bracket 402 further includes a plate portion 402d having a mounting aperture at 402e for mounting rear suspension as described herein. As also shown in FIG. 13, bracket 356 includes rear plate portion 356a having mounting aperture at 356b, where aperture 356b is offset from aperture 402e for mounting rear suspension as described herein.

As also shown in FIG. 13, a rear drive 430 (shown as a differential) is shown coupled to subframe 232 and which includes a drive input at 432 and drive outputs 434 (only the left output 434 is shown).

Figure 14:
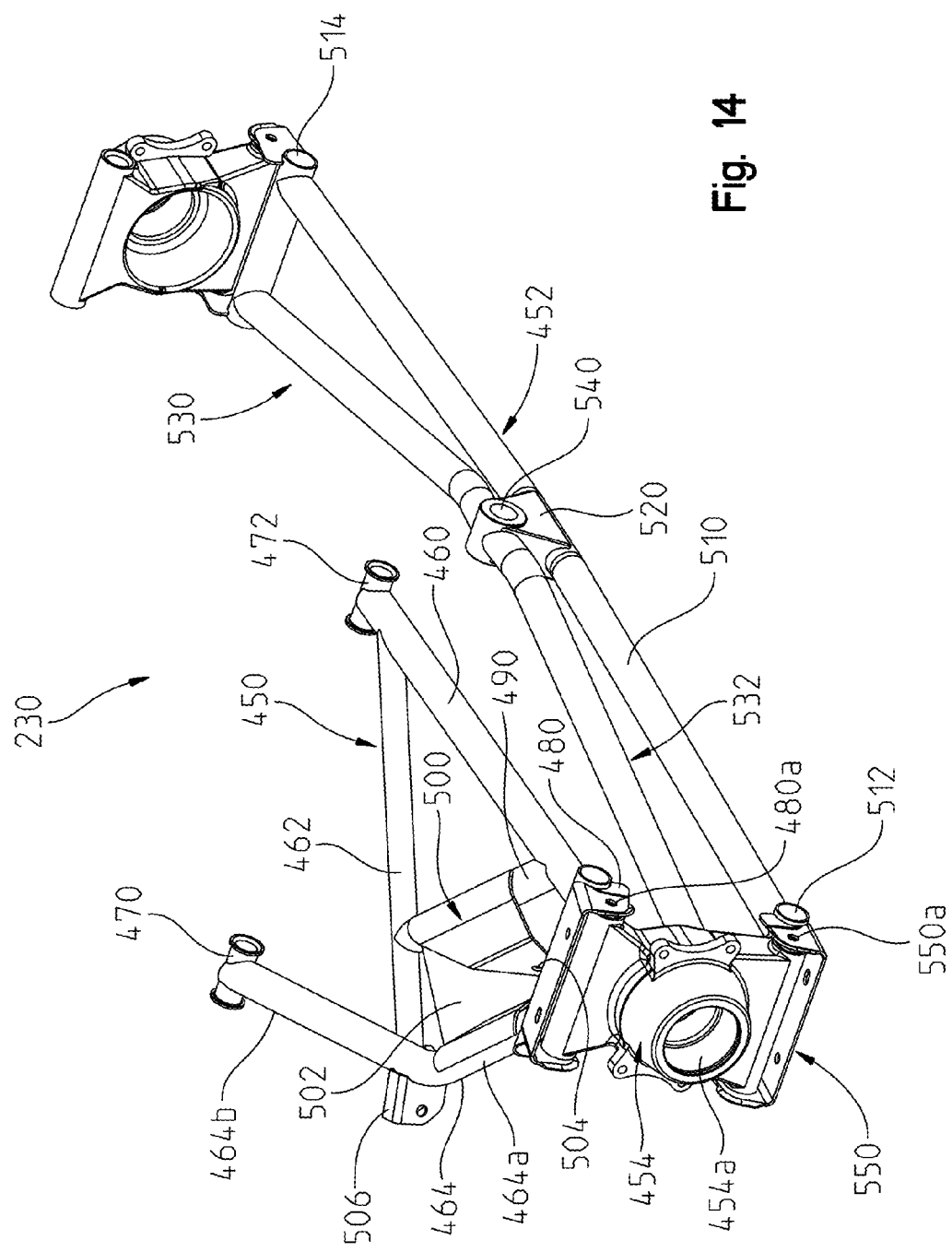
FIG. 14 shows a left rear perspective view of the rear alignment arms.

With reference now to FIG. 14, rear suspension 230 is shown. As shown, rear suspension 230 includes an upper suspension member 450, a lower suspension member 452, wherein the upper and lower suspension members 450, 452 are coupled to a spindle 454. As shown, upper suspension member 450 includes frame arms 460 and 462 coupled to arm 464. Arm 464 includes portion 464a coupled between arms 460 and 462 and arm portion 464b turned inwardly and including a coupling mount 470. A complementary coupling mount 472 is provided at the end of the intersection of tubes 460, 462. A mounting bracket 480 is provided at the end of tubes 460 and 464, including mounting apertures 480a for mounting wheel spindle 454 as described herein. Upper suspension member 450 further includes tube portion 490 coupling tubes 460 and 462 together, and running generally parallel with tube portion 464a. Tube portion 464a and 490 have a bracket 500 coupled thereto where bracket 500 includes a recessed well at 502 having a mounting aperture 504 as described herein. Finally, upper suspension member 450 includes a bracket 506 as described herein.

With reference still to FIG. 14, lower suspension member 452 includes a cross tube 510 having a cross tube 512 mounted at a first end and cross tube 514 mounted at a second end. Triangular bracket 520 is mounted to cross tube 510 midway there between. Lower suspension member 452 also includes cross tube 530 having a first end coupled to cross tube 514 and a second end coupled to bracket 520. A second tube 532 has a first end coupled to bracket 520 and a second end coupled to cross tube 512. As shown, bracket 520 includes a pivot mount at 540, with a pivot axis extending in a generally longitudinal direction of the vehicle. Finally, lower suspension member 452 includes a lower bracket 550 coupled to cross tube 512 including mounting apertures at 550a for mounting to wheel spindle 545 as described herein.

With respect now to FIGS. 9-14, the assembly of the vehicle rear suspension will be described. With reference first to FIG. 14, rear wheel spindles 454 are coupled to corresponding brackets 480 and 550 by way of fasteners (not shown) extending through apertures 480a and 550a. This pivotally couples spindle 454 relative to upper and lower suspension members 450 and 452. Subframe 232 is now coupled to frame 220 into the position of FIG. 9 by way of a fastener (not shown) extending through apertures 348 (FIG. 12) through coupling 362 (FIG. 13). This allows subframe 232 to pivot relative to frame 250 about an axis transverse to a longitudinal length of the vehicle.

Rear suspension 230 is now coupled to subframe by way of fasteners (not shown) through apertures 400b (FIG. 13) and through coupling 470 (FIG. 14); and a fastener through apertures 402c (FIG. 13) and through coupling 472 (FIG. 14). Coupling 520 (FIG. 14) is also coupled to subframe 232 by way of a fastener through apertures 356b and 402e (FIG. 13), and through aperture 540 (FIG. 14). Torsion bar 246 is also coupled to rear suspension 230 by way of a fastener through apertures 246b (FIG. 13) and through bracket 506 (FIG. 14) on upper suspension member 450 (FIG. 14). Finally, a shock absorber (not shown) is coupled between rear suspension 230 and frame 220 and couples at a lower end at aperture 504 (FIG. 14) and an upper end to aperture 330 (FIG. 12).

Thus in the embodiment of FIGS. 9-14, subframe 232 houses rear drive 430, yet allows pivotal movement between subframe 232 and frame 220. It should be appreciated that a stub shaft or half shaft (not shown) is coupled between output drive 434 of rear drive 430 and extends through openings 454a (FIG. 14) to drive a wheel hub attached to wheel spindle 454. Because the subframe 232 (and rear drive 430) moves relative to the frame 220, rear suspension 230 need not provide all of the vertical travel for the vehicle suspension. Rather, a portion of the vertical movement is provided by subframe 232 and a portion of the vertical movement is provided by rear suspension 230. Yet in the embodiment shown in FIGS. 9-14, the suspension is accomplished by way of two shock absorbers rather than four in the embodiment shown in FIGS. 1-5. This is due to the coupling of the upper and lower arms 450, 452 and the subframe 232.

Figure 15:
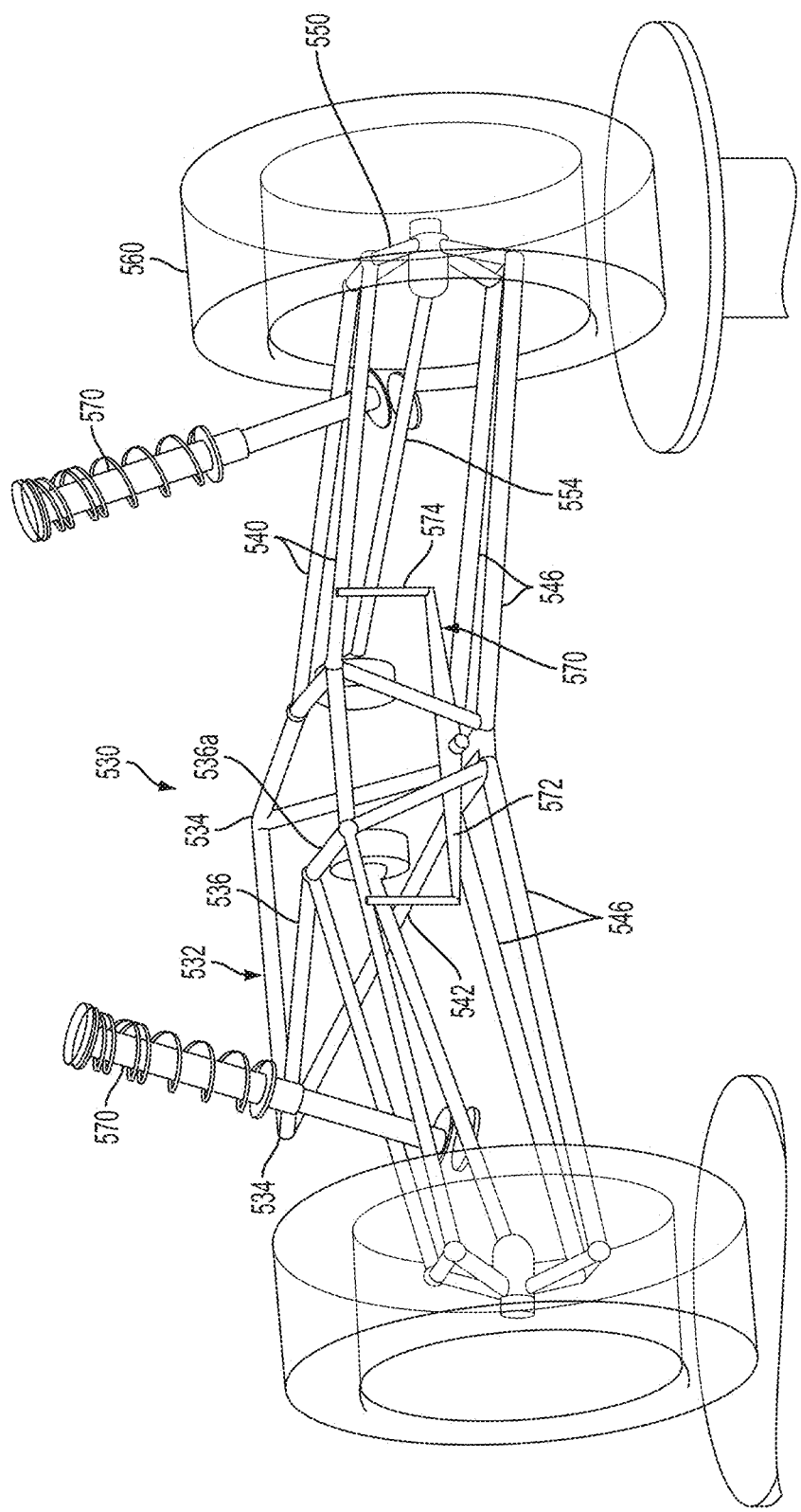
FIG. 15 shows a left rear perspective diagrammatical view of an alternate embodiment to that of FIGS. 9-14.

With reference now to FIG. 15, an alternative embodiment to the rear suspension of FIGS. 9-14 is shown diagrammatically. As shown, a rear suspension 530 is shown including subframe 532, which is pivotally attached at the front ends 534 of subframe 532. Subframe 532 includes frame members 536 having portions 536a having upper control arms 540 attached thereto. Subframe 532 includes a lower frame member 542 having lower control arms 546 coupled at inner ends thereto. Outer ends of control arms 540 and 546 connect to a wheel hub 550. Stub shafts 554 drivingly couple a final drive (not shown) to wheels 560. Shock absorbers 570 may be coupled between a mainframe of the vehicle and upper control arms 540. A coupling link 570 coupled to the subframe 532, couples the subframe 532 and upper control arms 540. Coupling link 570 includes a horizontal coupling portion 572 attached to subframe 532, and upright portions 574 coupled to upper control arms 540.

Figure 16:
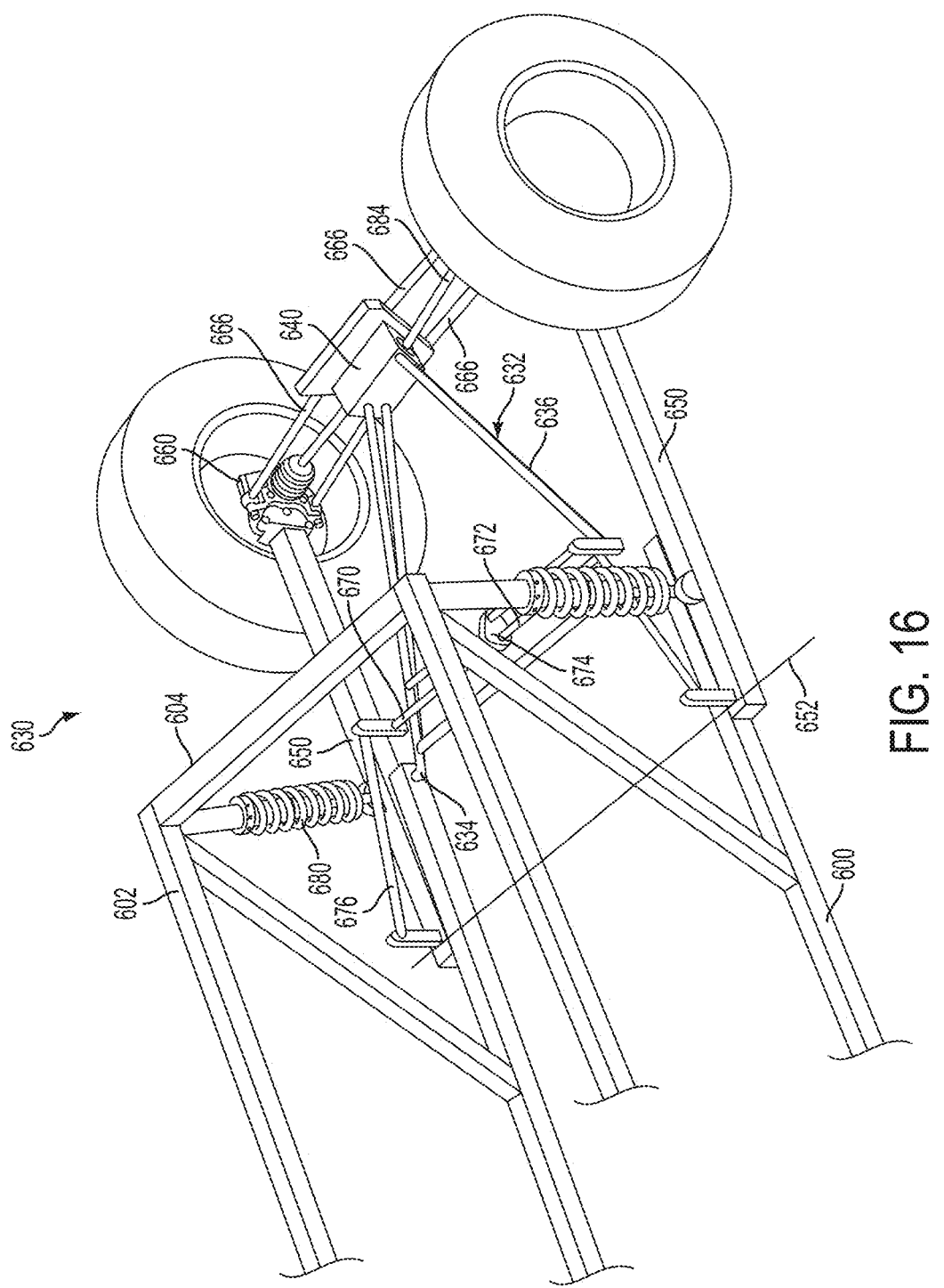
FIG. 16 shows a left front perspective diagrammatical view of a trailing arm version.
Figure 17:
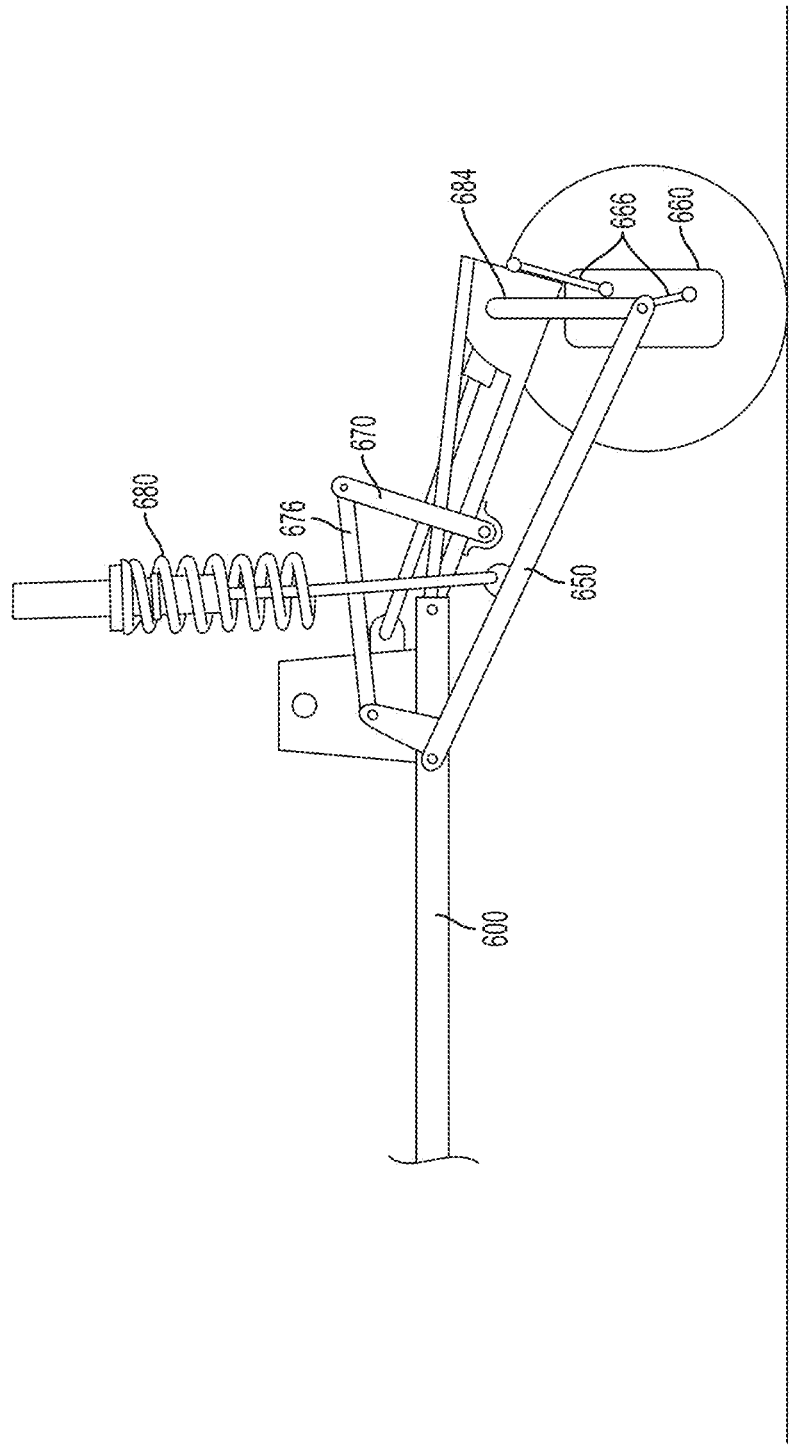
FIG. 17 shows a left diagrammatical view of the trailing arm version of FIG. 16 with the wheels in the maximum down position.
Figure 18:
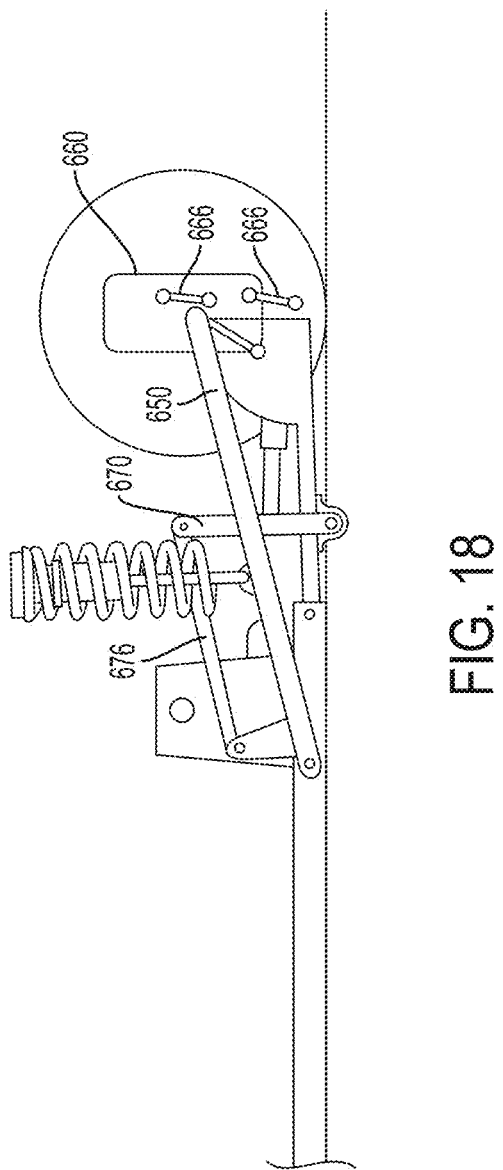
FIG. 18 shows a left diagrammatical view of the trailing arm version similar to that of FIG. 17 with the wheels in the maximum up position.

With reference now to FIGS. 16-18, a rear suspension is shown incorporating a trailing link suspension system. As shown first in FIG. 16, rear suspension 630 is provided including a subframe or swing arm 632 pivotally coupled to frame 600. Swing arm 632 includes pivot members 634 pivotally coupled to frame 600 and arms 636 coupled to final drive 640. Trailing arms 650 are pivotally coupled to frame 600 about pivot axis 652 at a forward end, and are attached to wheel hubs 660 at a rearward end. Control arms 666 are coupled between wheel hubs 660 and final drive 640. Trailing arms 650 and swing arm 632 are coupled together by way of a sway bar 670. Sway bar 670 includes a transverse portion 672, which is linked to swing arm 632 by way of link 674 and is linked to trailing arms 650 by way of link arms 676. A shock absorber 680 may be coupled between frame upright 602, 604 to trailing arms 650. Wheels are driven by stub shafts 684 from final drive 640. As shown in FIGS. 17 and 18, the extreme upper and lower positions are shown.

Figure 19:
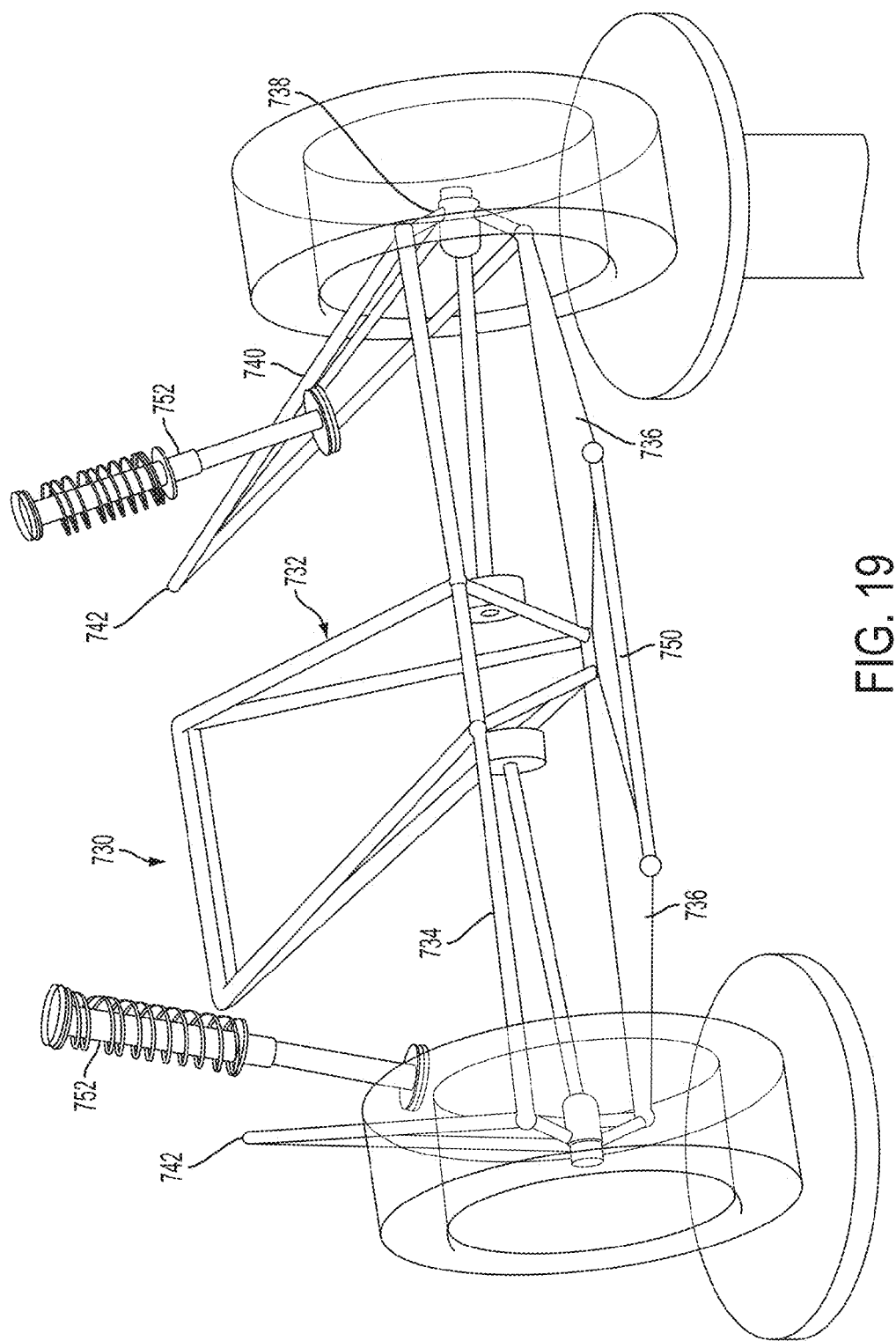
FIG. 19 shows a left rear perspective diagrammatical view of an alternate embodiment to that of FIG. 16.
Figure 20:
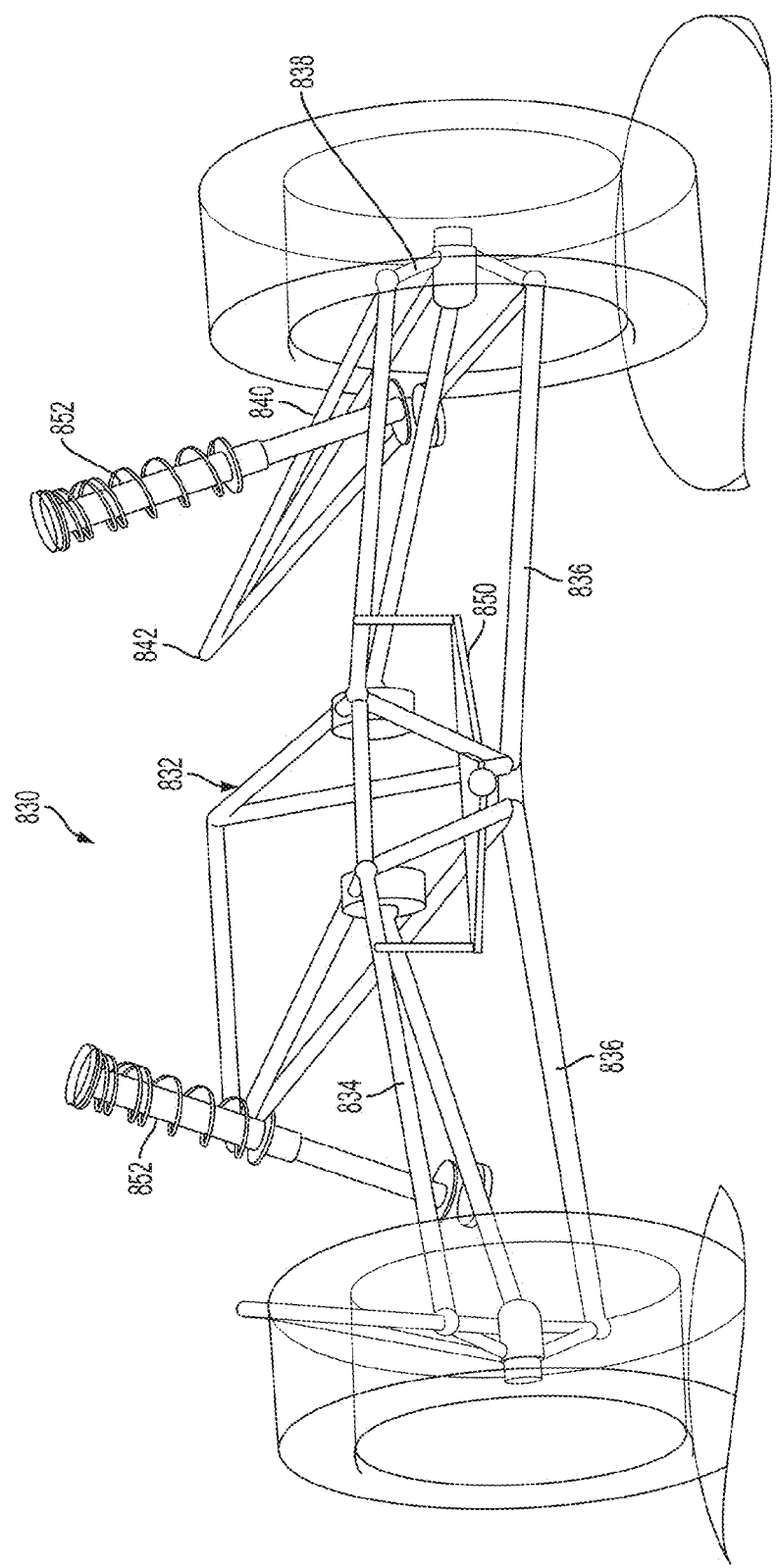
FIG. 20 shows a left rear perspective diagrammatical view of another alternate embodiment to that of FIG. 16.

With reference now to FIGS. 19 and 20, two further embodiments incorporating a trailing arm are shown. With reference first to FIG. 19, suspension 730 includes a subframe 732 having upper and lower control arms 734, 736, respectively, coupled to wheel hubs 738. Wheel hubs 738 are also coupled to trailing arms 740, which coupled to a frame at the forward ends 742. The trailing arms 740 and the subframe 732 are coupled together by way of link arm 750. Shock absorbers 752 could be included and be coupled between trailing arms 740 and a mainframe (not shown).

With reference now to FIG. 20, suspension 830 includes a subframe 832 having upper and lower control arms 834, 836, respectively, coupled to wheel hubs 838. Wheel hubs are also coupled to trailing arms 840, which coupled to a frame at the forward ends 842. The trailing arms and the subframe 832 are coupled together by way of link arm 850. Shock absorbers 852 could be included and coupled between trailing arms 840 and a mainframe (not shown).

Figure 21:
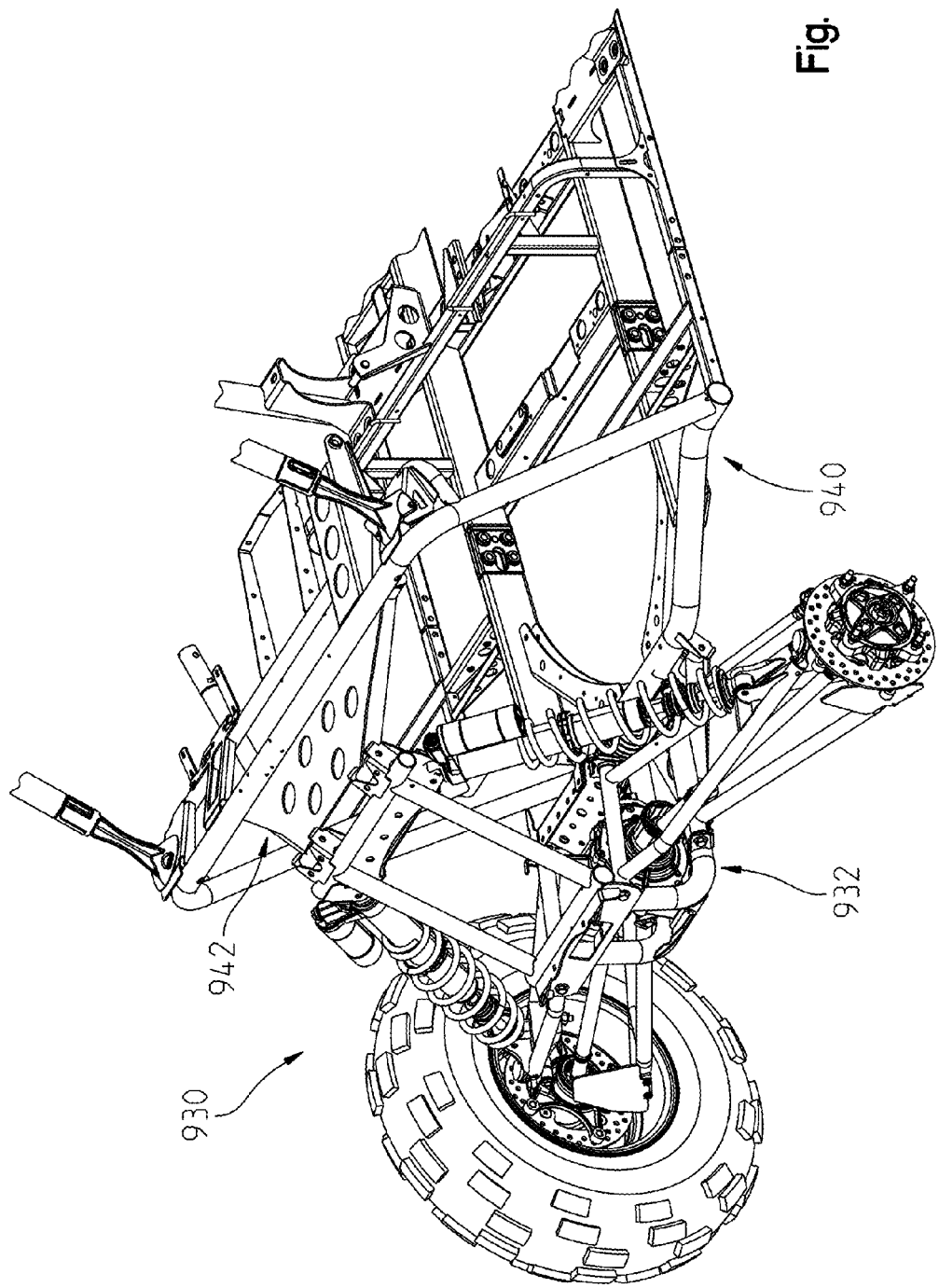
FIG. 21 shows a front left perspective view of the suspension as embodied in a front suspension.
Figure 22:
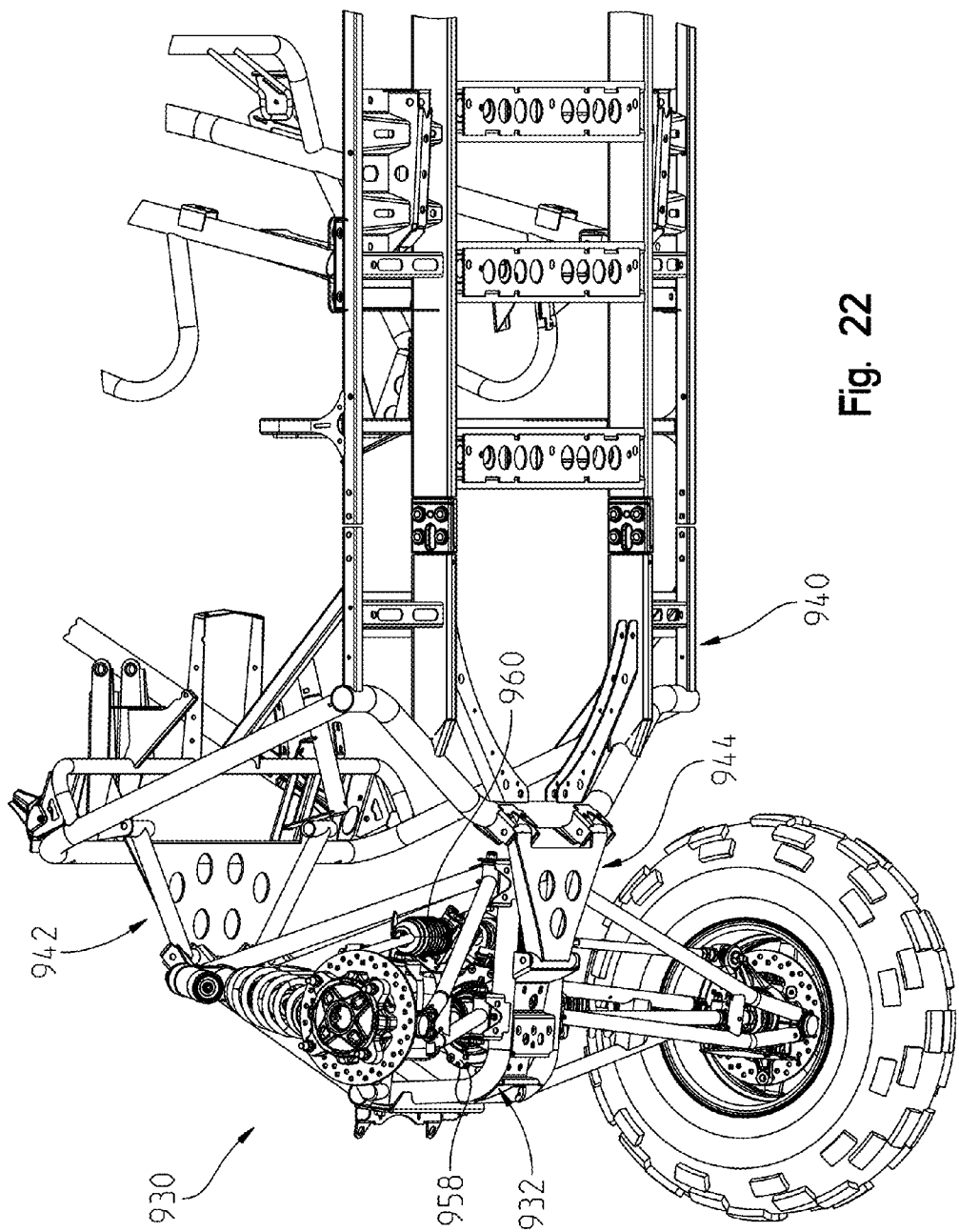
FIG. 22 shows an underside perspective view of the front suspension shown in FIG. 21.
Figure 23:
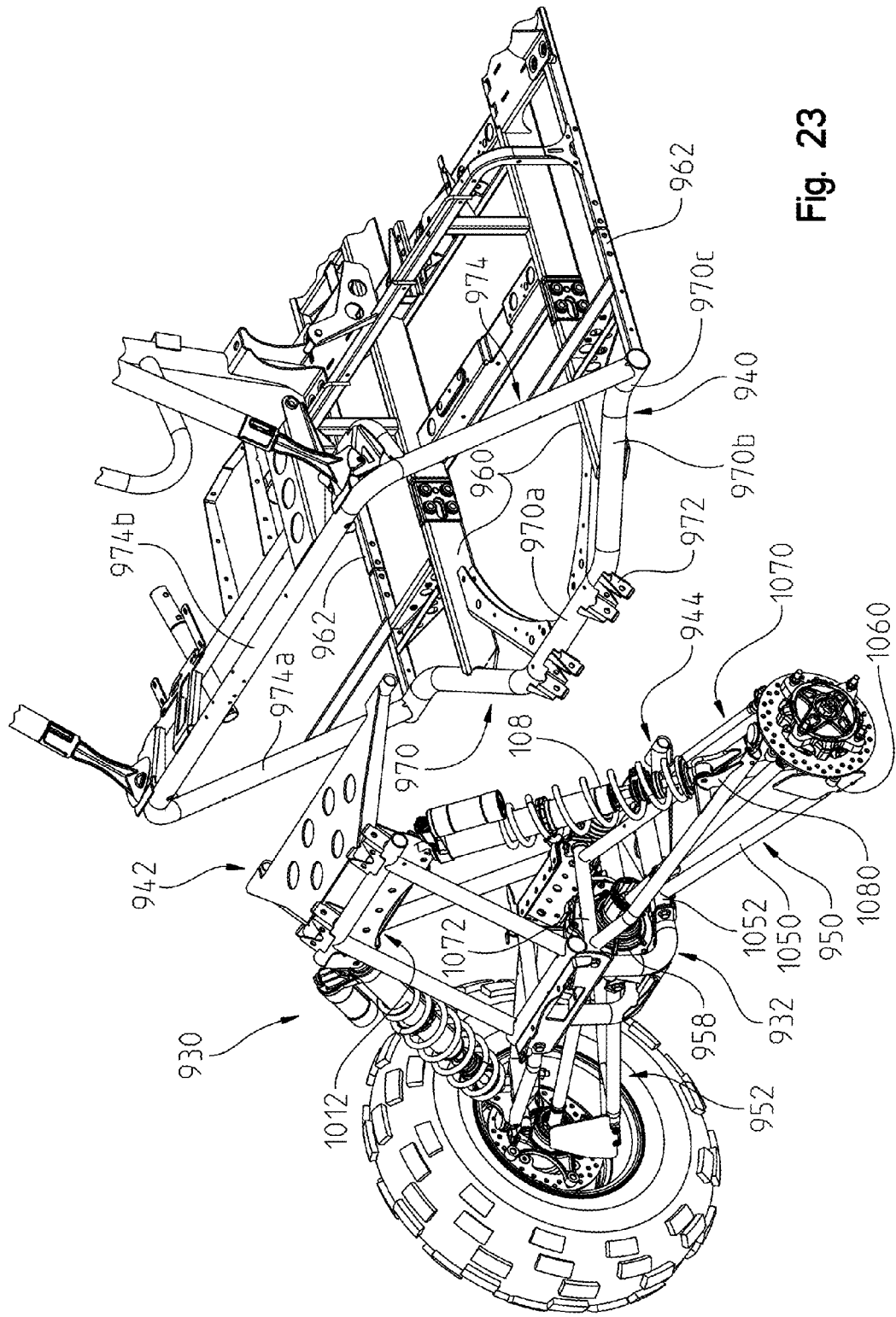
FIG. 23 shows a front left perspective view of the front suspension shown in FIG. 21 with the front frame portion exploded away from the main frame.
Figure 24:
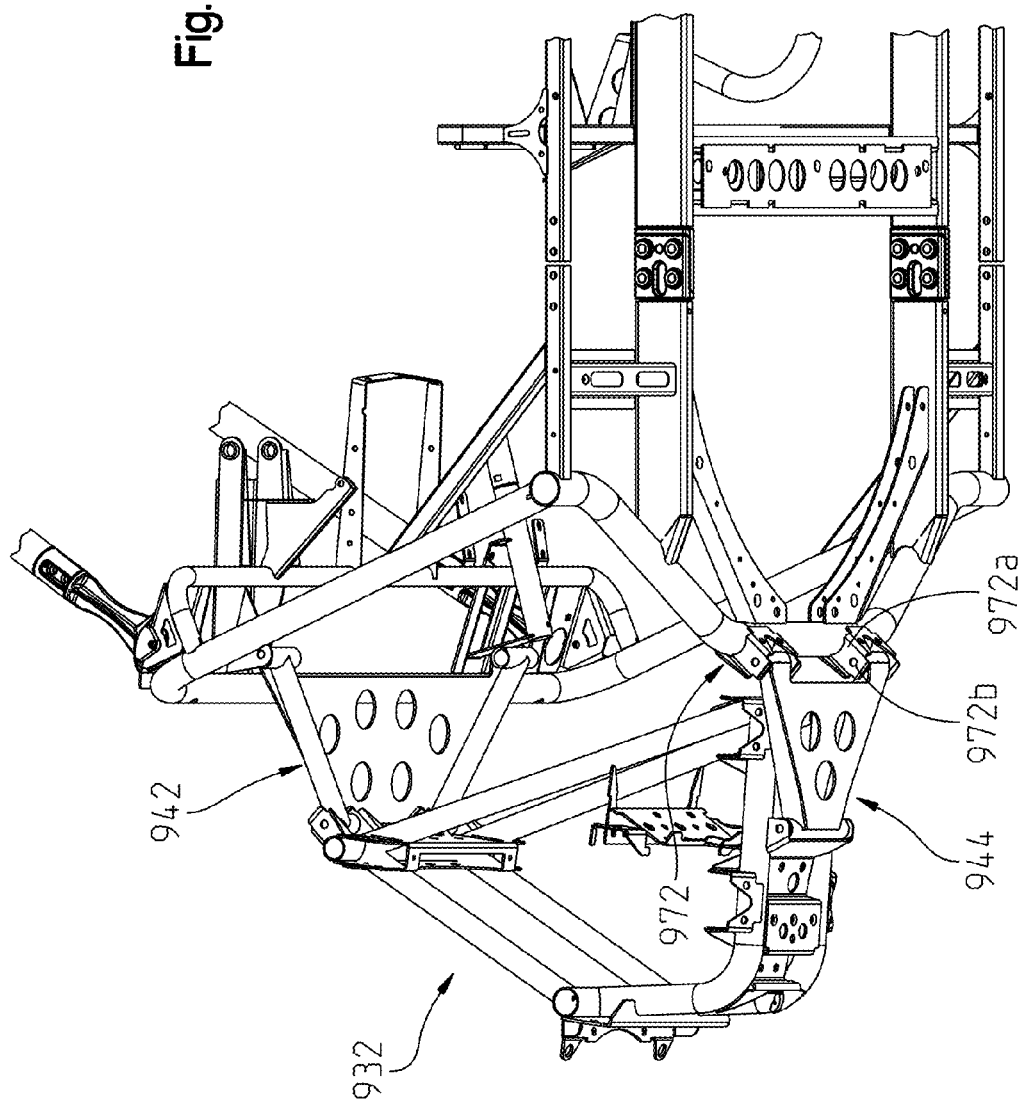
FIG. 24 shows an underside perspective view of the front frame portion, less the final drive, and control arms.

With reference now to FIGS. 21-26, an embodiment will now be described as it relates a front suspension. With reference first to FIGS. 21 and 22, a front suspension 930 is shown having a moveable subframe 932, which is coupled to, and movable relative to, mainframe 940. As shown in best in FIG. 22, subframe 932 is coupled to mainframe 940 by way of linkages 942 and 944. As shown in FIG. 23, subframe 932 has coupled thereto, left alignment arm assembly 950 and right alignment assembly 952. Subframe 932 houses front final drive 958 and steering gear 960 (FIG. 22).

Figure 25:
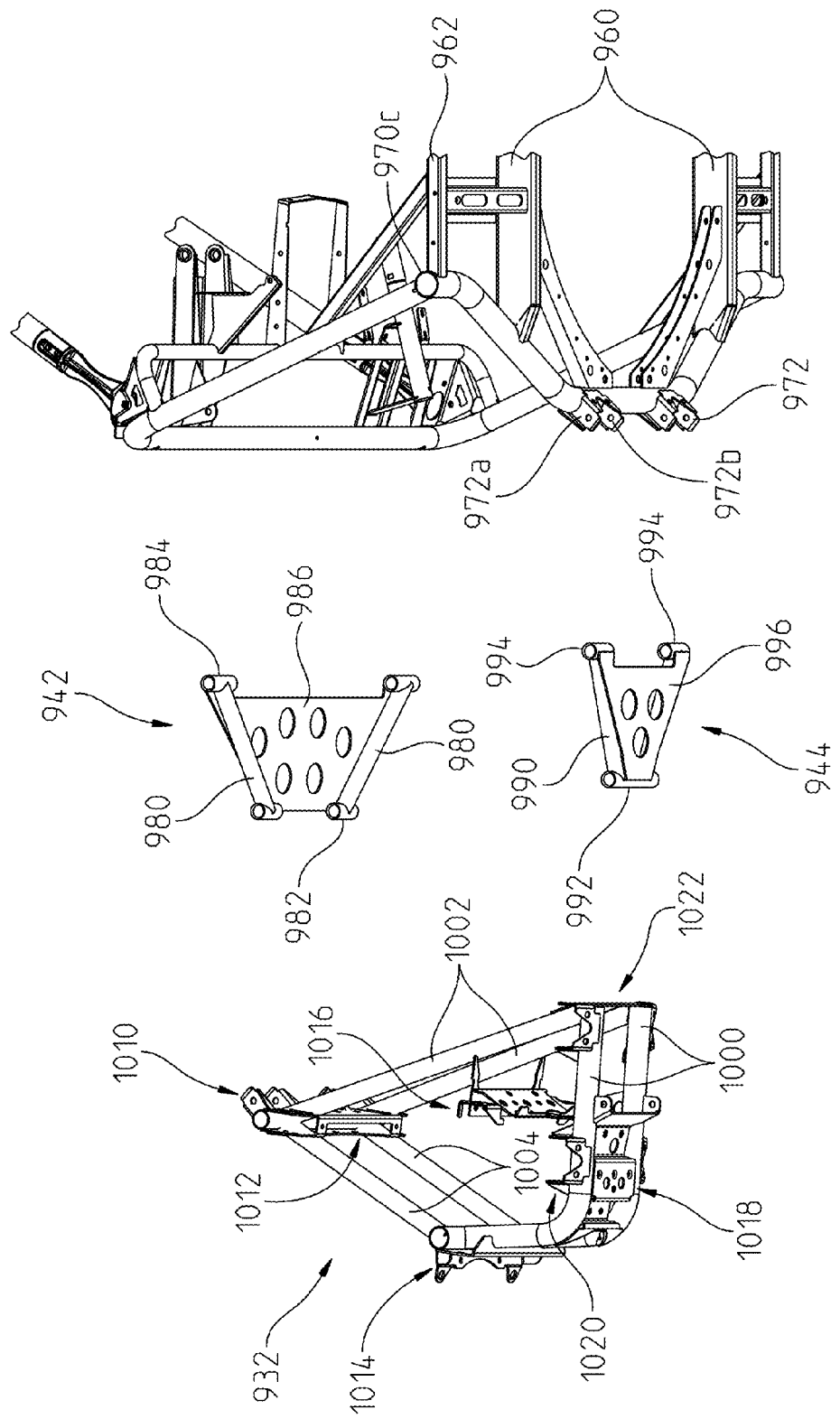
FIG. 25 shows a view similar to that of FIG. 24, showing the front frame portion exploded away from the main frame.

With reference to FIG. 23, mainframe 940 includes mainframe tubes 960, outer rails 962 to which front support tube 970 is coupled. Tube 970 includes a central portion 970a including brackets 972, angled sections 970b, and outer sections 970c. An upright tube 974 is coupled to tube portions 970c and includes generally vertically extending portions 974a, and a transverse portion 974b. While not shown, transverse portion 974b would include brackets similar to those shown at 972 for coupling link 942 thereto. As shown in FIG. 25, brackets 972 include spaced apart plate portions 972a each having a mounting aperture 972b.

With reference still to FIG. 25, upper link 942 includes support tubes 980, each having a forward coupler 982 and a rearward coupler 984. A support plate 986 supports the tubes 980 and rigidifies the link 942. Lower link 944 includes support tubes 990 having a forward coupler 992 and rearward couplers 994. A support plate 996 supports and rigidifies the lower link 944.

Figure 26:
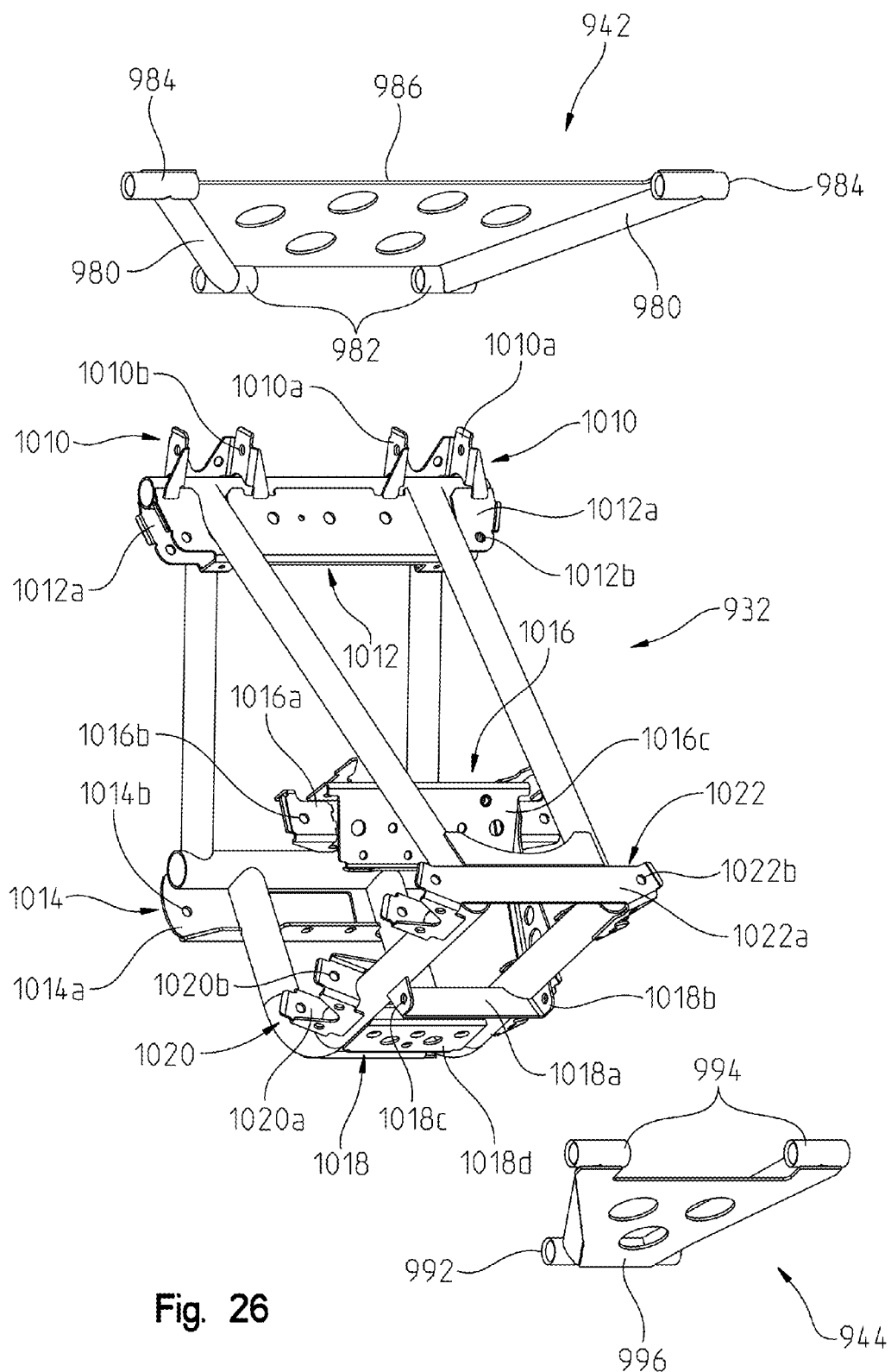
FIG. 26 shows a rear perspective view of the front frame portion.

With reference now to FIGS. 25 and 26, the front subframe 932 will be described in greater detail. Subframe 932 includes lower frame tubes 1000 and upright frame tubes 1002 and 1004. As shown, subframe 932 includes multiple brackets, namely, upper brackets 1010, shock mount bracket 1012, front bracket 1014, inner bracket 1016, lower bracket 1018, and mounting brackets 1020 and 1022. As shown best in FIG. 26, upper brackets 1010 include side plates 1010a, each including mounting apertures 1010b As shown, plates 1010a are spaced apart so as to receive couplings 982 therebetween with a fastener (not shown) through couplings 982 and apertures 1010b. Upper plate 1012 includes side plates 1012a, each including a mounting aperture at 1012b, as further described herein. Front bracket 1014 may be utilized to mount a winch (not shown) on the front side thereof and further including a mounting plate at 1014a having a mounting aperture 1014b. Mounting bracket 1016 includes side plates 1016a having a mounting aperture 1016b, which cooperates with mounting aperture 1014b as described herein. Mounting bracket 1016 further includes a mounting plate 1016a for mounting the steering gear 960 as depicted in FIG. 22. Bracket 1020 and 1022 include mounting plates 1020a, 1022a each having mounting apertures 1020b and 1022b. Finally lower plate 1018 includes a rear plate portion 1018a having mounting tabs 1018b each having a mounting aperture 1018c. Tabs 1018b are spaced apart so as to receive front coupler 992 of lower link 944. Bracket 1018 further includes a lower plate portion 1018d so as to mount front final drive 958 thereto (as shown in FIG. 23).

With reference again to FIG. 23, alignment arm assembly 950 includes a lower alignment arm (or A-arm) 1050, having inner couplings 1052. A first coupling 1052 is positioned between plates 1020a (FIG. 26) and a second coupling 1052 is positioned between plates 1022a (FIG. 26). An outer end of lower alignment arm 1050 is coupled to wheel hub 1060. Alignment arm assembly 950 further includes an upper alignment arm (or A-arm) 1070, having an inner coupling 1072 positioned between plates 1014a and 1016a (FIG. 26). Upper alignment arm 1070 includes a bracket 1080 which mounts shock absorber 1088 between upper alignment arm 1070 and bracket 1012

Figure 27:
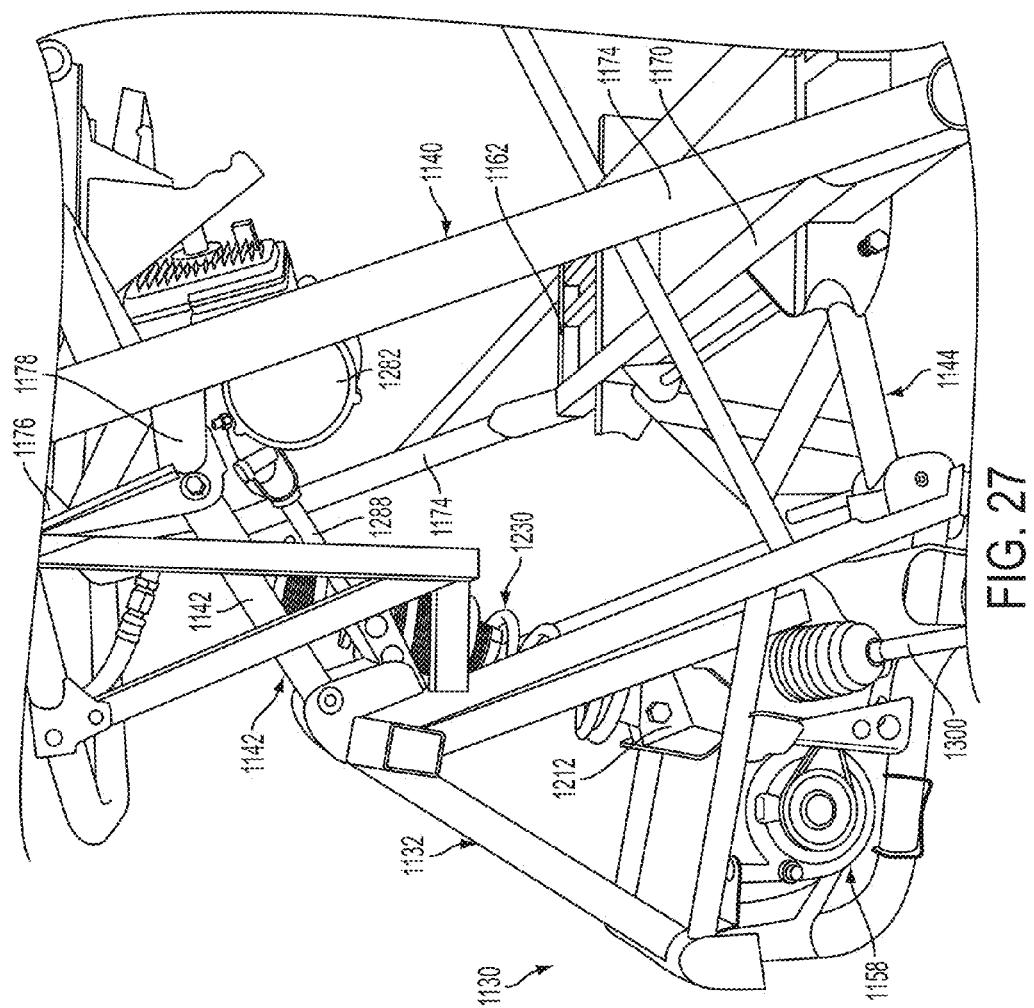
FIG. 27 shows a front left perspective view of alternate embodiment of the suspension of FIG. 21.
Figure 28:
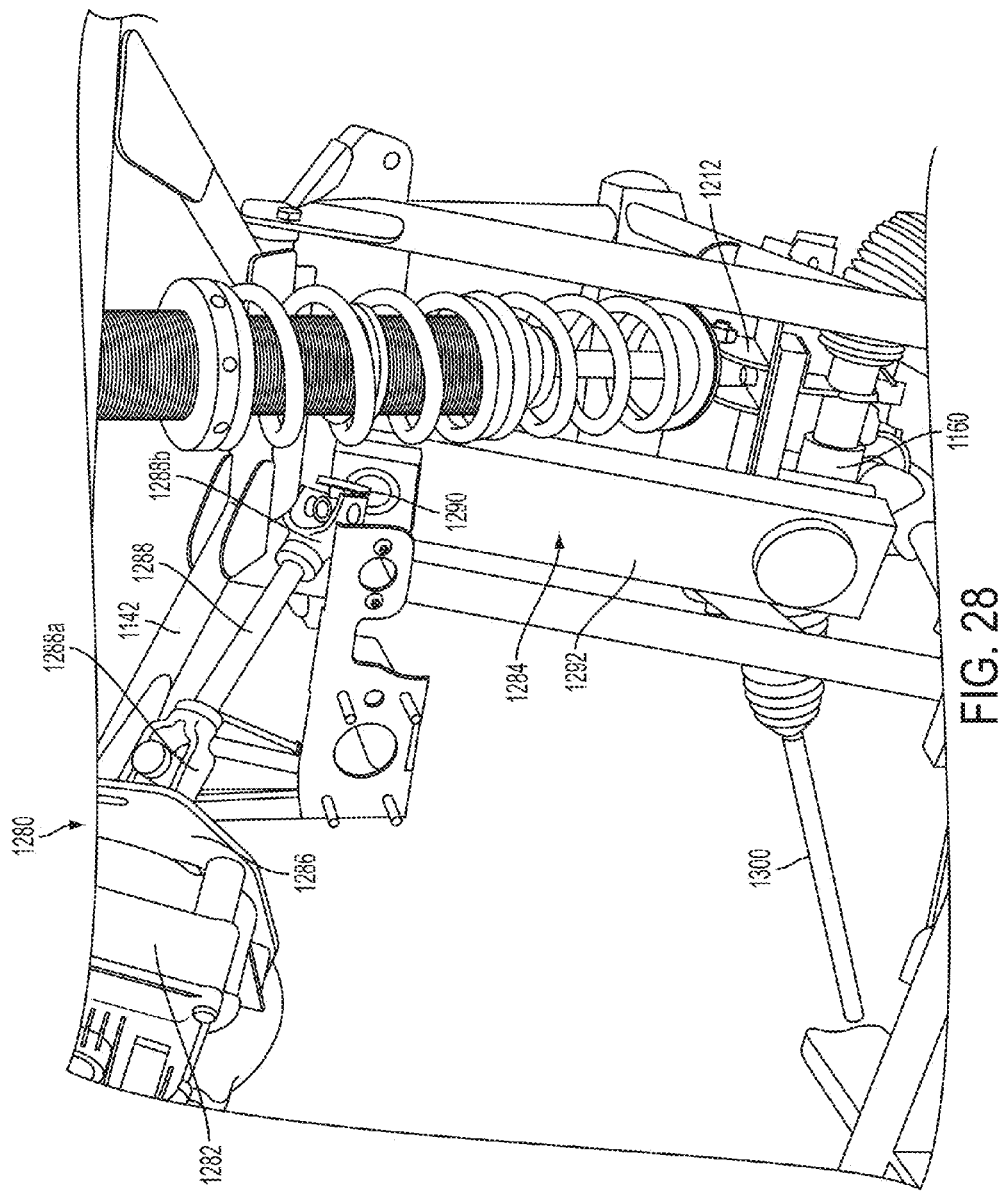
FIG. 28 shows a right rear perspective view of the suspension of FIG. 27.
Figure 29:
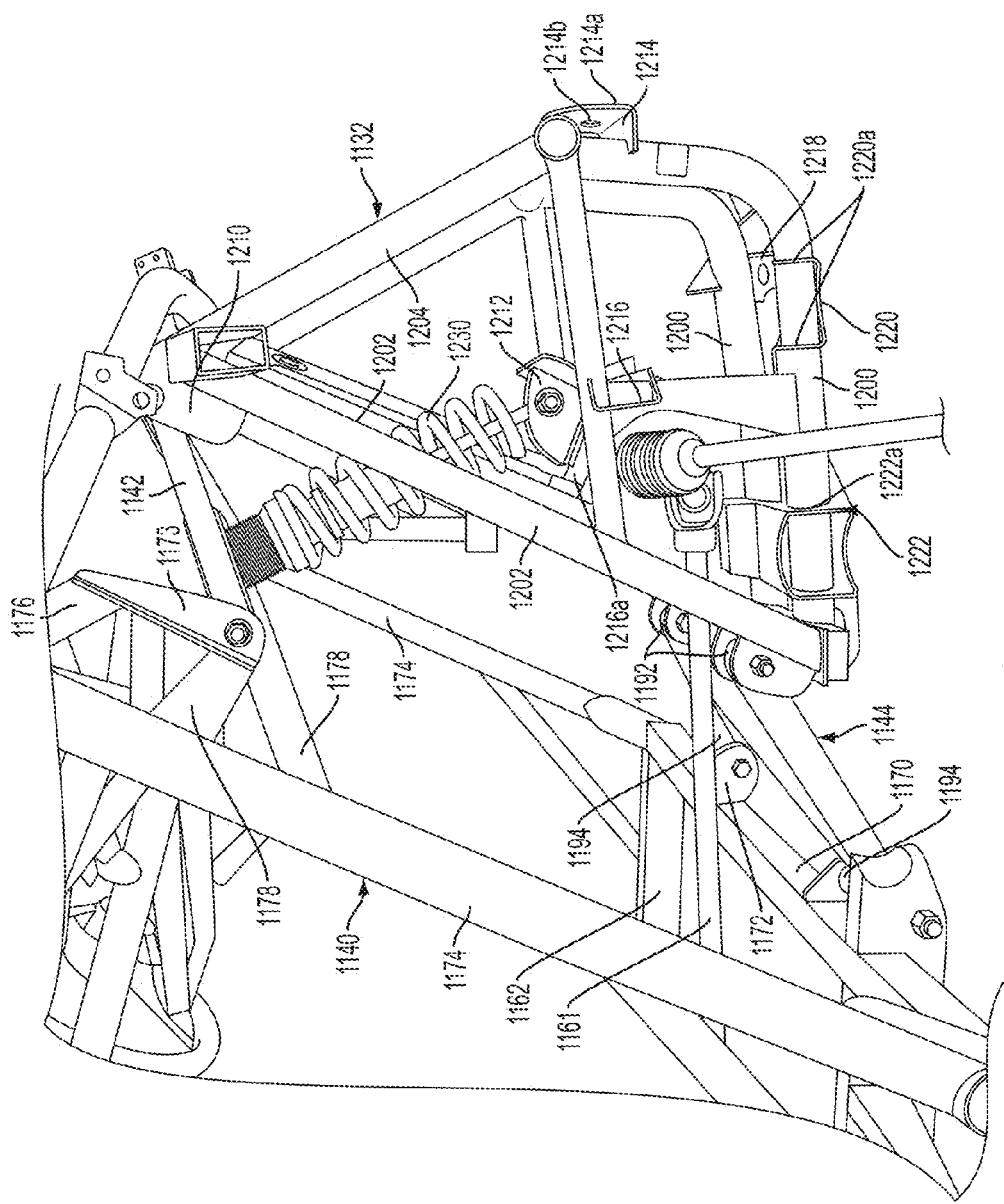
FIG. 29 shows a right side view of the suspension of FIG. 27.
Figure 30:
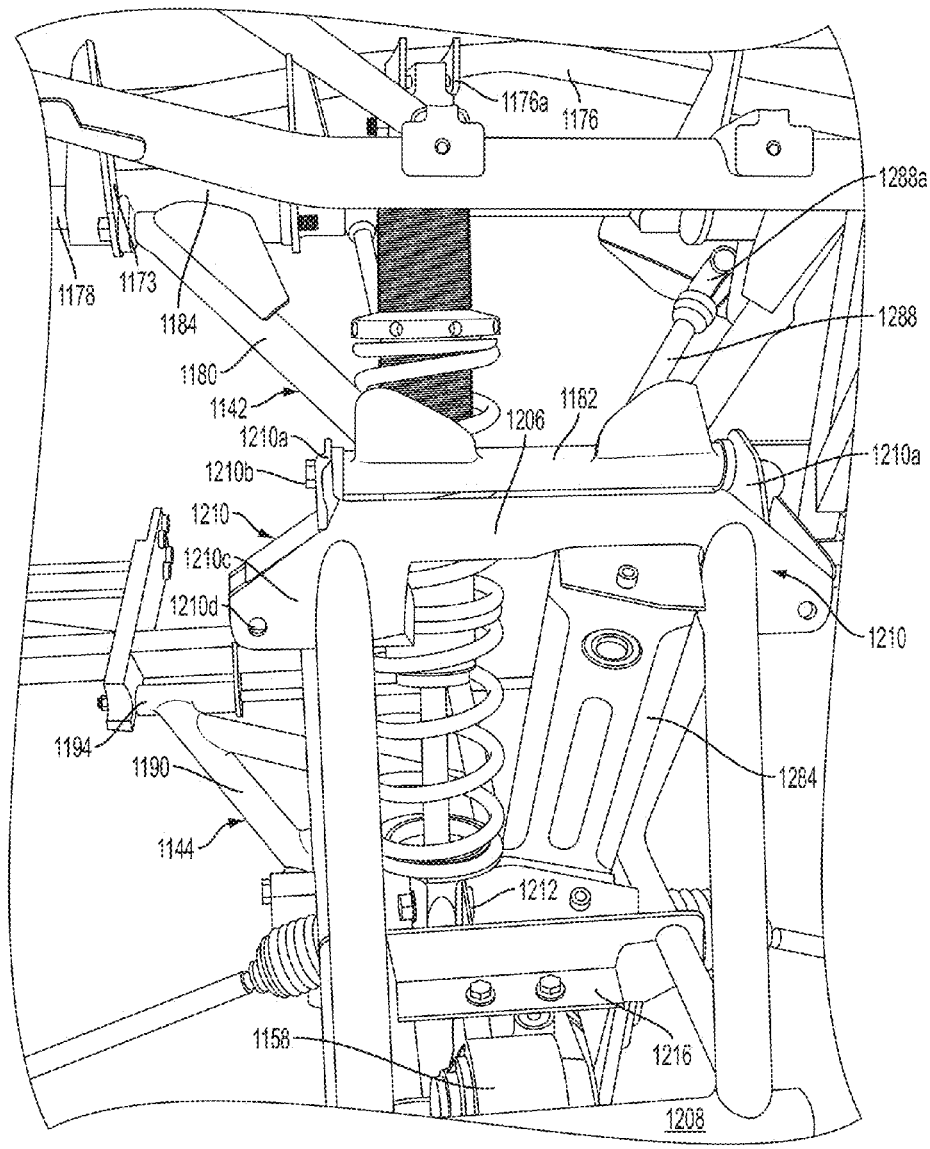
FIG. 30 shows a front view of the suspension of FIG. 27.
Figure 31:
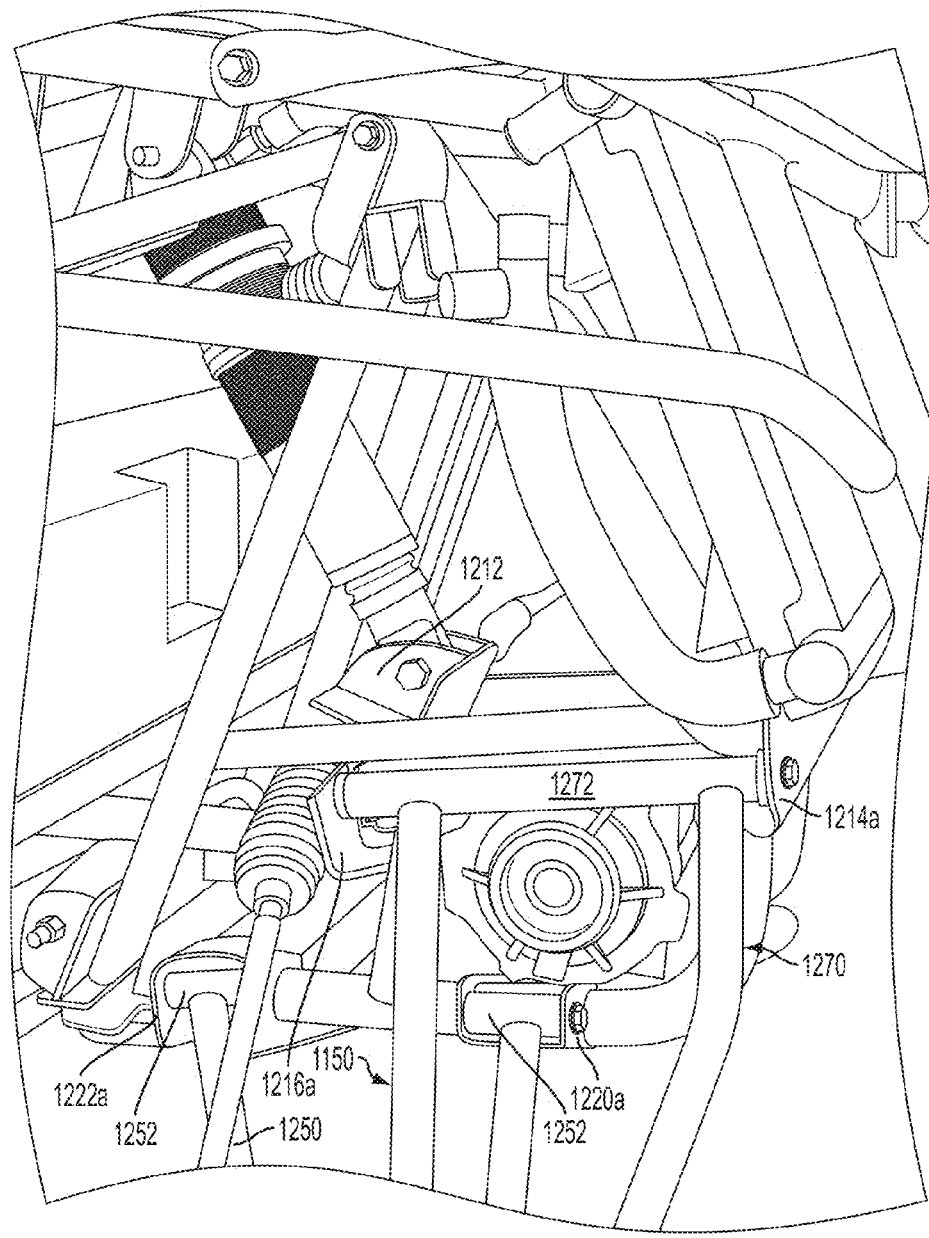
FIG. 31 shows a right side view of the complete suspension of FIG. 27.

With reference now to FIGS. 27-31, a second embodiment will now be described as it relates a front suspension. With reference first to FIGS. 27 and 29, a front suspension 1130 is shown having a moveable subframe 1132, which is coupled to, and movable relative to, mainframe 1140. As shown, subframe 1132 is coupled to mainframe 1140 by way of linkages 1142 and 1144. As shown in FIG. 31, subframe 1132 has coupled thereto, alignment arm assembly 1150. It should be appreciated that a mirror image alignment arm assembly extends from the opposite side. As shown in FIGS. 27 and 28, subframe 1132 houses front final drive 1158 and steering gear 1160 (FIG. 28). Final drive 1158 is coupled to the transmission by way of a drive shaft 1161, as is known.

With reference to FIG. 27, mainframe 1140 includes mainframe tubes 1162 to which front support tube 1170 is coupled. An upright tube 1174 is coupled to tube 1170 and frame further includes generally horizontally extending tubes 1176 and 1178 extending between upright tubes 1174 (FIG. 27). As shown best in FIG. 29, support tube 1170 includes brackets 1172 for pivotal coupling of lower link 1194. Brackets 1173 are attached to tubes 1176 and 1178 and provide pivotal coupling for upper link 1142.

With reference to FIG. 30, upper link 1142 includes support tubes 1180, having a forward coupler 1182 and rearward couplers 1184. Lower link 1144 includes support tubes 1190 having forward couplers 1192 (FIG. 29) and rearward couplers 1194.

With reference now to FIGS. 27 and 29, the front subframe 1132 will be described in greater detail. Subframe 1132 includes lower frame tubes 1200, upright frame tubes 1202 and 1204, and cross tubes 1206 and 1208 (FIG. 30). As shown, subframe 1132 includes multiple brackets, namely, shock mount bracket 1176a (FIG. 30), upper brackets 1210, shock mount bracket 1212, front bracket 1214, inner bracket 1216 (FIG. 30), lower bracket 1218, and mounting brackets 1220 and 1222. As shown, upper bracket 1210 includes upright plates 1210a spaced apart so as to receive coupling 1182 therebetween with a fastener 1210b. Upper bracket 1210 further includes side plates 1210c, each including a mounting aperture at 1210d, as further described herein.

Front bracket 1214 may be utilized to mount a winch (not shown) on the front side thereof and further including a mounting plate at 1214a having a mounting aperture 1214b, as shown in FIG. 29. Mounting bracket 1216 includes side plates having a mounting aperture (not shown), which cooperates with mounting aperture 1214b as described herein. Mounting bracket 1216 further includes a mounting plate 1216a for mounting the steering gear 1160 as depicted in FIG. 29. Brackets 1220 and 1222 include mounting plates 1220a, 1222a each having mounting apertures. Lower plate 1216 mounts front final drive 1158 thereto (as shown in FIG. 30).

Thus, front subframe 1132 is pivotally covered to mainframe 940, by way of pivot links 1142 and 1144. A shock absorber 1230 is positioned between front subframe 1132 and mainframe 940, shock absorber 1230 being coupled to brackets 1176a and 1212 (FIG. 31).

With reference to FIG. 31, alignment arm assembly 1150 includes a lower alignment arm (or A-arm) 1250, having inner couplings 1252. A first coupling 1252 is positioned between plates 1220a and a second coupling 1252 is positioned between plates 1222a. An outer end of lower alignment arm 1250 is coupled to a wheel hub (not shown). Alignment arm assembly 1150 further includes an upper alignment arm (or A-arm) 1270, having an inner coupling 1272 positioned between plates 1214a and 1216a (FIG. 31).

With reference now to FIGS. 28 and 30, steering assembly 1280 is shown. Steering assembly 1280 generally comprises steering motor 1282, transfer gear 1284 and steering gear 1160. Steering motor 1282 receives input from a steering shaft (not shown) which in turn receives input from a steering wheel (not shown). Steering motor 1282 is attached to main frame 1140, by way of a bracket 1286, thus steering motor 1282 is fixed relative to the vehicle main frame 1140, during the movement of subframe 142.

As shown best in FIG. 28, steering assembly 1280 further comprises a universal joint 1288 having a first coupling 1288a coupled to the steering motor 1282, and a second coupling 1288b coupled to an input shaft 1290 of transfer gear 1284. It should be appreciated that transfer gear 1284 includes a first sprocket (not shown) internally of gear housing 1292, and a chain (not shown) that drives a second sprocket (not shown). The second sprocket drives the steering gear 1160. Transfer gear 1284 is similar to that shown and described in application Ser. No. 61/703,383, the subject matter of which is incorporated herein by reference. As shown in FIGS. 27 and 28, universal joint 1288 and upper link 1142 are substantially parallel. This allows universal joint 1288 and upper link 1142 to move together without any binding due to a difference in relative movement.

Alternatively, the universal joint 1288 and upper link 1142 could be of different lengths, but where one telescopes relative to the other. Further yet, the universal joint 1288 and upper link 1142 could be of different lengths, but fixed in length, where the unequal lengths causes the subframe to rotate, and limit the dive behavior upon braking.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
a frame having a left suspension attachment point and a right suspension attachment point;
ground engaging members supporting the frame;
a propulsion unit supported by the frame;
a sub-frame pivotably coupled to the frame;
a final drive drivingly coupled to the propulsion unit, and supported by the sub-frame;
right and left suspension assemblies coupling the ground engaging assemblies to the frame independent of each other; the right suspension attachment point providing a point on the frame that couples the right suspension assembly to the frame separately and independently from the left suspension assembly, the left suspension attachment point providing a point on the frame that couples the left suspension assembly to the frame separately and independently from the right suspension assembly; and
drive members coupling the rear drive to the ground engaging members.

2. The vehicle of claim 1, wherein the right and left suspension assemblies comprise trailing arms suspended from the frame and coupled to the ground engaging members.

3. The vehicle of claim 2, wherein the right and left suspension assemblies further comprise linear force elements (LFE) coupled between the trailing arms and the sub-frame.

4. The vehicle of claim 1, wherein the right and left suspension assemblies comprise control arms suspended from the sub-frame and coupled to the ground engaging members.

5. The vehicle of claim 4, wherein the right and left suspension assemblies further comprise linear force elements (LFE) coupled between the control arms and the sub-frame.

6. The vehicle of claim 1, further comprising a suspension assembly coupled between the frame and the sub-frame.

7. The vehicle of claim 6, wherein the suspension assembly comprises at least one linear force element (LFE).

8. The vehicle of claim 1, wherein the final drive is a differential.

9. The vehicle of claim 1, wherein the final drive is a front final drive.

10. The vehicle of claim 9, wherein the sub frame is coupled to the frame by way of upper and lower pivot links.

11. The vehicle of claim 10, further comprising a steering gear supported by the sub frame and movable therewith.

12. The vehicle of claim 11, further comprising a steering motor supported by the frame.

13. The vehicle of claim 12, further comprising a steering link coupling the steering motor and steering gear.

14. The vehicle of claim 13, wherein the steering link is parallel with the upper pivot link.

15. The vehicle of claim 1, wherein the final drive is a rear final drive.

16. A vehicle, comprising:
a frame;
ground engaging members supporting the frame;
a propulsion unit supported by the frame;
a sub-frame pivotably coupled to the frame;
a final drive drivingly coupled to the propulsion unit, and supported by the sub-frame, the final drive being movable with the sub-frame relative to the propulsion unit;
at least some of the ground engaging members being driven ground engaging members and the driven ground engaging members being movable relative to the frame and sub-frame; and
drive members coupling the final drive to the driven ground engaging members; at least one linear force element (LFE) coupled between the ground engaging members and the sub-frame, and at least one LFE coupled between the frame and the sub-frame.

17. The vehicle of claim 16, further comprising right and left suspensions which allow the driven ground engaging members to being movable relative to the frame and sub-frame.

18. The vehicle of claim 17, wherein the right and left suspensions allow the driven ground engaging members to being movable relative to the frame independent of each other.

19. The vehicle of claim 18, wherein the right and left suspensions comprise trailing arms suspended from the frame and coupled to the ground engaging members.

20. The vehicle of claim 19, wherein the right and left suspensions further comprise linear force elements (LFE) coupled between the trailing arms and the sub-frame.

21. The vehicle of claim 16, wherein the right and left suspensions comprise control arms suspended from the sub-frame and coupled to the ground engaging members.

22. The vehicle of claim 21, wherein the right and left suspensions further comprise linear force elements (LFE) coupled between the control arms and the sub-frame.

23. The vehicle of claim 16, wherein the right and left suspensions comprise a lower suspension member pivotably mounted to the sub-frame and coupling the ground engaging assemblies to opposite ends of the lower suspension member.

24. The vehicle of claim 23, wherein the lower suspension member is a solid link and pivots about an axis parallel with a longitudinal axis of the vehicle.

25. The vehicle of claim 24, further comprising upper control arms coupled to the ground engaging members and the sub-frame.

26. The vehicle of claim 25, further comprising linear force elements (LFE) coupled between the upper control arms and the sub-frame.

27. The vehicle of claim 16, further comprising a suspension assembly coupled between the frame and the sub-frame.

28. The vehicle of claim 27, wherein the suspension assembly comprises at least one linear force element (LFE).

29. The vehicle of claim 16, wherein the final drive is a differential.

30. The vehicle of claim 16, wherein the final drive is a front final drive.

31. The vehicle of claim 30, wherein the sub frame is coupled to the frame by way of upper and lower pivot links.

32. The vehicle of claim 31, further comprising a steering gear supported by the sub frame and movable therewith.

33. The vehicle of claim 32, further comprising a steering motor supported by the frame.

34. The vehicle of claim 33, further comprising a steering link coupling the steering motor and steering gear.

35. The vehicle of claim 34, wherein the steering link is parallel with the upper pivot link.

36. The vehicle of claim 16, wherein the rear drive is a differential.

37. A vehicle, comprising:
a frame;
ground engaging members supporting the frame;
a propulsion unit supported by the frame;
a sub-frame pivotably coupled to the frame;
a rear drive drivingly coupled to the propulsion unit, and supported by the sub-frame;
a lower suspension member that is pivotably mounted to the sub-frame via first pivot point and that separately couples one of the ground engaging assemblies members to the frame about a second pivot point; and drive members coupling the rear drive to the ground engaging members.

38. The vehicle of claim 37, wherein the lower suspension member is a solid link and pivots about an axis parallel with a longitudinal axis of the vehicle.

39. The vehicle of claim 37, further comprising upper control arms coupled to the ground engaging members and the sub-frame.

40. The vehicle of claim 39, further comprising linear force elements (LFE) coupled between the upper control arms and the sub-frame.

41. The vehicle of claim 37, wherein the lower suspension member is movably coupled to the sub-frame.

42. The vehicle of claim 40, wherein the lower suspension member is coupled by way of a link.

43. The vehicle of claim 42, wherein the link is a torsion link.

44. The vehicle of claim 37, wherein the rear drive is a differential.

\* \* \* \* \*